(12) United States Patent
Milbright

(10) Patent No.: US 10,967,209 B2
(45) Date of Patent: Apr. 6, 2021

(54) ANCHORAGE ASSEMBLY AND METHOD OF USING

(71) Applicant: 3M INNOVATIVE PROPERTIES COMPANY, St. Paul, MN (US)

(72) Inventor: Michael N. Milbright, Red Wing, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/975,992

(22) PCT Filed: Feb. 28, 2019

(86) PCT No.: PCT/IB2019/051637
§ 371 (c)(1),
(2) Date: Aug. 26, 2020

(87) PCT Pub. No.: WO2019/166996
PCT Pub. Date: Sep. 6, 2019

(65) Prior Publication Data
US 2021/0038930 A1  Feb. 11, 2021

Related U.S. Application Data

(60) Provisional application No. 62/696,690, filed on Jul. 11, 2018, provisional application No. 62/637,080, filed on Mar. 1, 2018.

(51) Int. Cl.
*A62B 35/00* (2006.01)
*F16B 2/04* (2006.01)
*E04G 21/32* (2006.01)

(52) U.S. Cl.
CPC ...... *A62B 35/0068* (2013.01); *E04G 21/3295* (2013.01); *F16B 2/04* (2013.01)

(58) Field of Classification Search
CPC combination set(s) only.
See application file for complete search history.

(56) References Cited

U.S. PATENT DOCUMENTS

| 3,486,726 | A | * | 12/1969 | Kindorf | F16L 3/243 |
| | | | | | 248/72 |
| 4,075,924 | A | | 2/1978 | McSherry | |
| 4,294,156 | A | * | 10/1981 | McSherry | F16B 37/04 |
| | | | | | 411/345 |
| 4,863,132 | A | * | 9/1989 | Fitzgerald | A47B 97/00 |
| | | | | | 248/274.1 |

(Continued)

FOREIGN PATENT DOCUMENTS

KR   1020130083515   7/2013

OTHER PUBLICATIONS

"Instructions for Use AN220AS Continuous Concrete Insert Anchor", Protecta International, 2017, pp. 1-2.

(Continued)

*Primary Examiner* — Monica E Millner
(74) *Attorney, Agent, or Firm* — Kenneth B. Wood

(57) ABSTRACT

An anchorage assembly including first and second plates that are slidably movable relative to each other, each plate comprising an upper head with an outwardly-extending flange, and the first plate including at least one spreader ramp positioned in an upper portion of the first plate.

20 Claims, 14 Drawing Sheets

(56) References Cited

U.S. PATENT DOCUMENTS

| | | | | |
|---|---|---|---|---|
| 5,156,233 A * | 10/1992 | Olsen | ...................... | E04G 17/00 |
| | | | | 182/3 |
| 5,570,865 A * | 11/1996 | Godfrey | ................. | A47B 96/06 |
| | | | | 248/222.11 |
| 5,598,785 A * | 2/1997 | Zaguroli, Jr. | ............. | B66C 7/04 |
| | | | | 104/111 |
| 5,924,260 A * | 7/1999 | Austin | .................. | E04B 1/4107 |
| | | | | 403/363 |
| 7,843,349 B2 | 11/2010 | Rohlf | | |
| 8,256,574 B2 | 9/2012 | Griffiths | | |
| 8,430,206 B2 | 4/2013 | Griffiths | | |
| 8,430,207 B2 | 4/2013 | Griffiths | | |
| 8,632,279 B2 * | 1/2014 | Taylor | .................. | E02D 29/0233 |
| | | | | 405/262 |
| 8,893,852 B2 | 11/2014 | Liggett | | |
| 9,488,235 B2 | 11/2016 | Casebolt | | |
| 2004/0074695 A1 | 4/2004 | Henry | | |
| 2004/0256176 A1 * | 12/2004 | Argoud | .................. | A62B 35/04 |
| | | | | 182/45 |
| 2006/0054386 A1 * | 3/2006 | Blackford | ................ | A62B 1/14 |
| | | | | 182/3 |
| 2015/0014092 A1 * | 1/2015 | Blaise | ................ | A62B 35/0068 |
| | | | | 182/5 |
| 2016/0288765 A1 * | 10/2016 | Brodie | ............... | A62B 35/0056 |
| 2017/0276844 A1 | 9/2017 | McCoy | | |

OTHER PUBLICATIONS

International Search Report for PCT International Application No. PCT/IB2019/051637, dated Jun. 12, 2019, 3 pages.

* cited by examiner

ANCHORAGE ASSEMBLY AND METHOD OF USING

CROSS REFERENCE TO RELATED APPLICATIONS

This application is a national stage filing under 35 U.S.C. 371 of PCT/IB2019/051637, filed Feb. 28, 2019, which claims the benefit of provisional Application No. 62/696,690, filed Jul. 11, 2018, and also claims the benefit of provisional Application No. 62/637,080, filed Mar. 1, 2018, the disclosure of which is incorporated by reference in its/their entirety herein.

BACKGROUND

Anchorage assemblies are often used to provide overhead anchorage points to which, for example, a self-retracting lifeline may be attached in order to provide protection for a worker positioned at an elevated height.

SUMMARY

In broad summary, herein is disclosed an anchorage assembly comprising first and second plates that are slidably movable relative to each other, each plate comprising an upper head with an outwardly-extending flange, and the first plate comprising at least one spreader ramp positioned in an upper portion of the first plate. These and other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Figure 1:
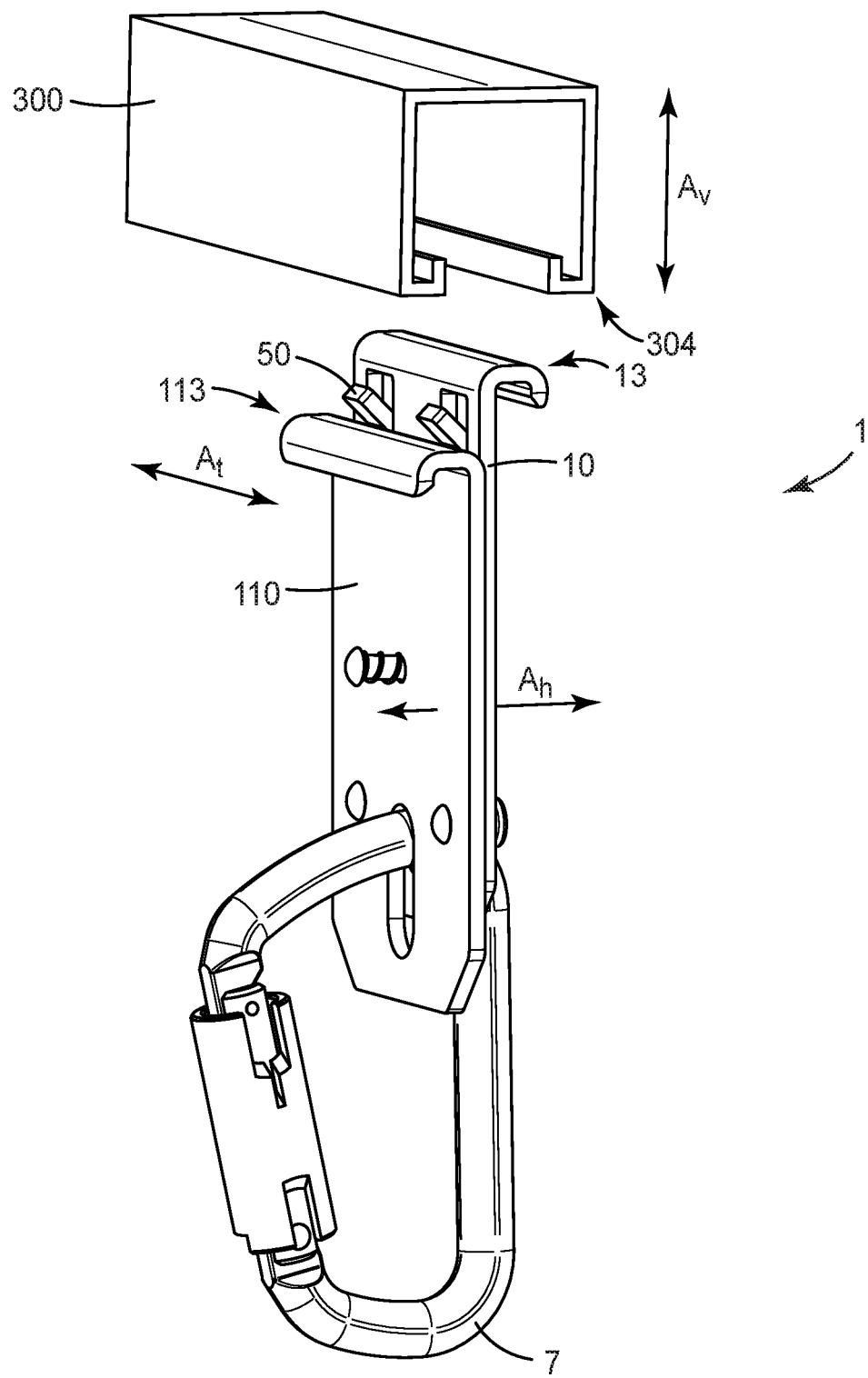
FIG. 1 is a perspective view of an exemplary anchorage assembly in a first, ready position for being installed into a strut channel.
Figure 2:
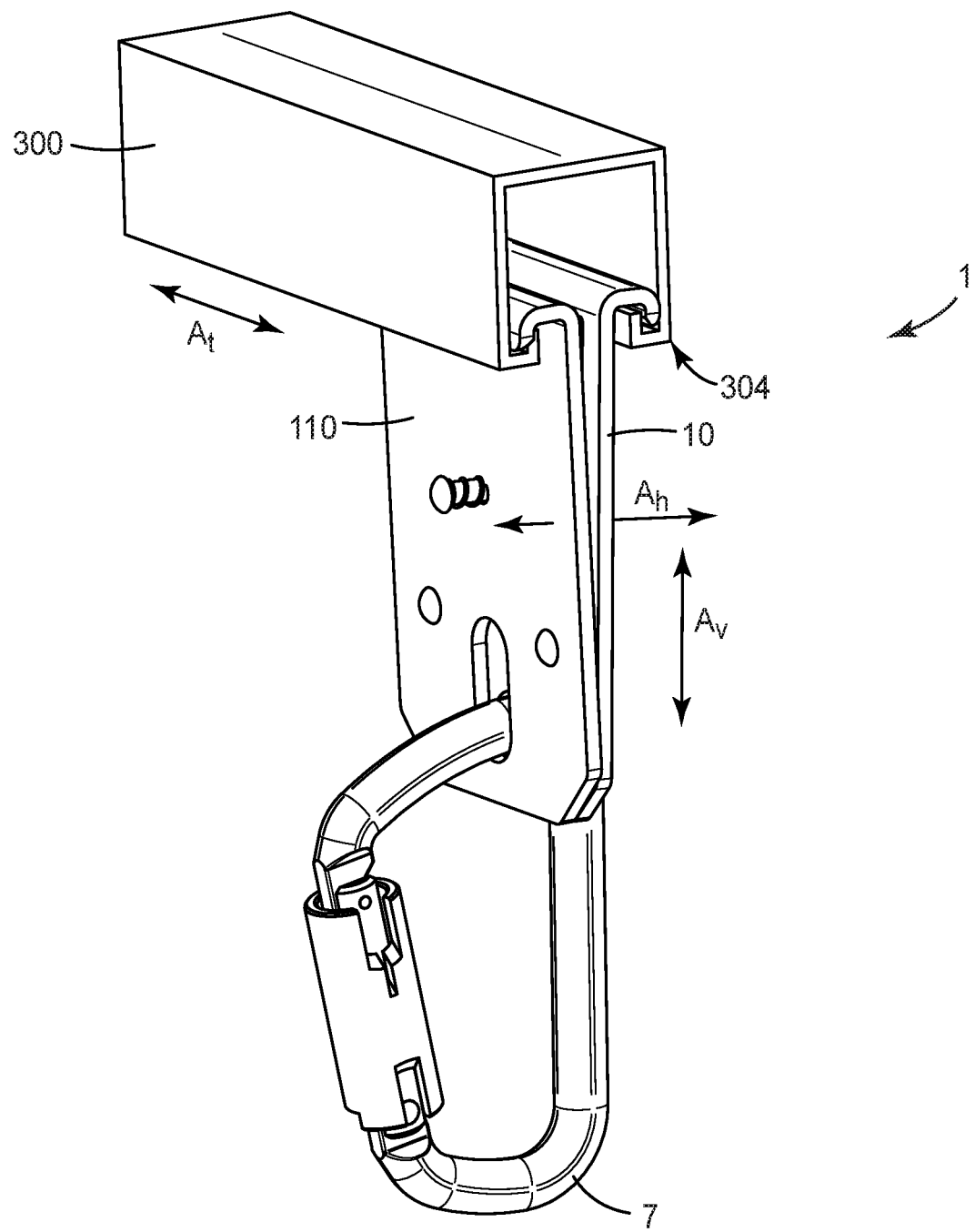
FIG. 2 is a perspective view of an exemplary anchorage assembly in a second, installed position in a strut channel.
Figure 3:
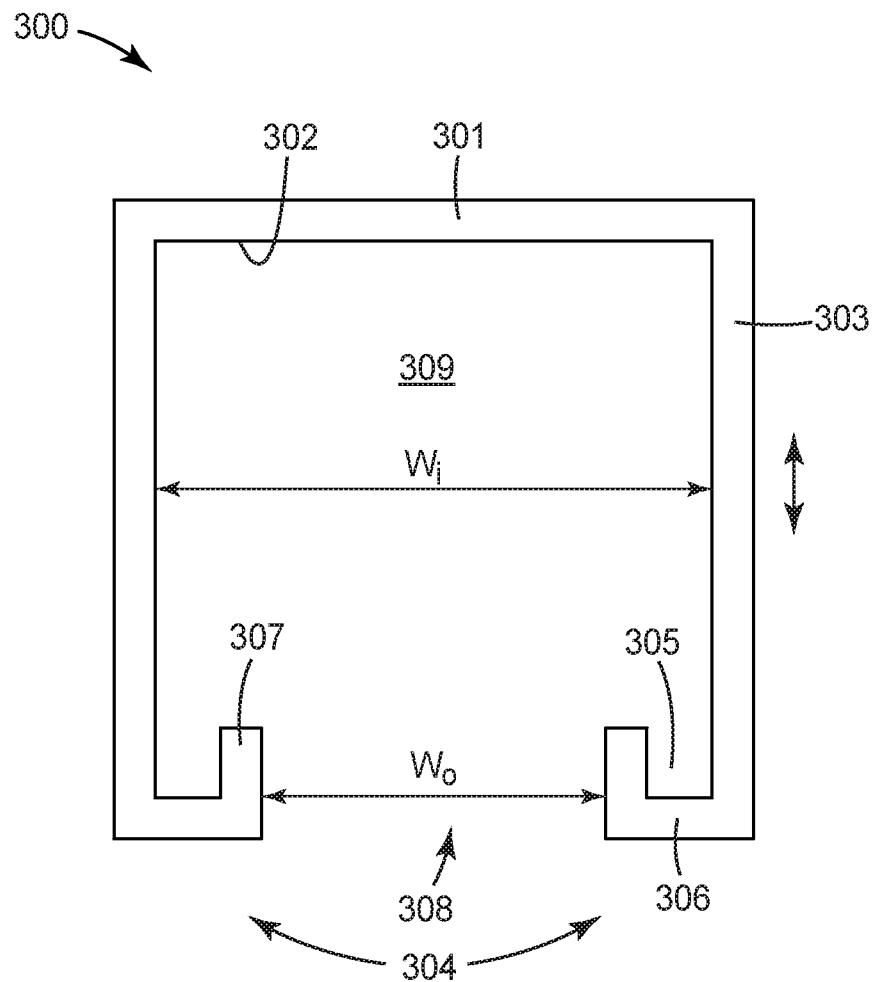
FIG. 3 is a cross-sectional schematic view of a strut channel, viewed along the long axis of the strut channel.

Terms such as top, bottom, upper, lower, under, over, above, beneath, and so on, have their ordinary meaning with respect to the herein-disclosed anchorage assembly when positioned and oriented for installation into a strut channel that is downward-facing (e.g. overhead-mounted) as shown in FIGS. 1, 2 and 3. With the anchorage assembly in such a position, the vertical axis of the anchorage assembly will have its customary meaning and is indicated as axis $A_v$ in FIGS. 1 and 2. The transverse axis $A_t$ of the anchorage assembly refers to a direction along the anchorage assembly that is aligned with the long axis of the strut channel into which the anchorage assembly is installed, as indicated in FIGS. 1 and 2. The thickness axis $A_h$ of the anchorage assembly refers to a direction that is orthogonal to the vertical axis $A_v$ and to the transverse axis $A_t$. The thickness axis will be aligned with a lateral (width) dimension of the strut channel in which the anchorage assembly is installed and will often be the shortest dimension of the anchorage assembly (as is the case for the exemplary anchorage assembly shown in FIGS. 1 and 2). Terms such as outward and inward refer specifically to directions along the thickness axis $A_h$ of the anchorage assembly; inward means toward a location of the anchorage assembly that is centermost along this axis; outward means a direction that is away from such a centermost location, as discussed in detail later herein. Any feature that is designated herein as being an aperture, an orifice, or a window, will be understood to be a through-hole that that extends completely through the thickness of the plate and is open at both ends to allow passage therethrough. Terms such as first and second are used in their relative sense, for convenience of description.

As used herein as a modifier to a property or attribute, the term "generally", unless otherwise specifically defined, means that the property or attribute would be readily recognizable by a person of ordinary skill but without requiring a high degree of approximation (e.g., within +/−20% for quantifiable properties). The term "substantially", unless otherwise specifically defined, means to a high degree of approximation (e.g., within +/−5% for quantifiable properties). The term "essentially" means to a very high degree of approximation (e.g., within plus or minus 2% for quantifiable properties); it will be understood that the phrase "at least essentially" subsumes the specific case of an "exact" match. However, even an "exact" match, or any other characterization using terms such as e.g. same, equal, identical, uniform, constant, and the like, will be understood to be within the usual tolerances or measuring error applicable to the particular circumstance rather than requiring absolute precision or a perfect match. The term "configured to" and like terms is at least as restrictive as the term "adapted to", and requires actual design intention to perform the specified function rather than mere physical capability of performing such a function.

DETAILED DESCRIPTION

Disclosed herein is an anchorage assembly 1 configured so that it can be installed into a strut channel 300, as shown in exemplary embodiment in FIGS. 1 and 2. Anchorage assembly 1 comprises first and second plates 10 and 110 that are vertically slidably movable (i.e., along the axis marked $A_v$ in FIGS. 1 and 2) relative to each other. This relative movement may be accomplished by movement of either one, or both, of plates 10 and 110; however, in practice it may often be most convenient to move plate 110 relative to plate 10 as will be made evident by the detailed discussions that follow. The upper end of each plate comprises an upper head that is configured to engage with a holder 304 of a strut channel 300 of the general type shown in FIG. 3. First plate 10 comprises at least one spreader ramp 50 positioned in an upper portion of the plate as visible in FIG. 1.

First and second plates 10 and 110, when ready for use, can be configured in a first, ready position, as shown in FIG. 1. In such a position the upper heads 13 and 113 of both plates can be passed upward into the interior of a strut channel 300. Then, the plates can be vertically slidably moved relative to each other, which relative motion will result in spreader ramp(s) 50 causing the upper end of the plates to spread apart from each other so that the plates are in a second, installed position as shown in FIG. 2. With the plates in their second, installed position, the upper head of each plate is able to engage with a holder 304 of the strut channel 300 as shown in FIG. 2, with the result that anchorage assembly 1 is installed into the strut channel 300.

Anchorage assembly 1 is configured to be used with a strut channel Strut channels (sometimes referred to as channels or C-channels) are widely used for various purposes in building construction, renovation and so on. Examples of strut channels include various products available from Atkore International (Harvey, Ill.) under the trade designations POWER-STRUT and UNISTRUT. An exemplary strut channel 300 is depicted in cross-section in FIG. 3; such a strut channel typically comprises a base 301, sidewalls 303, and holders 304 that define an opening 308 therebetween. Such a strut channel is often mounted with the base 301 oriented upwards (as in FIG. 3) with opening 308 facing downward and with a long axis of the strut channel extending in a generally horizontal direction. Each holder 304 typically comprises an structure that curves interiorly, e.g. with a lower, generally horizontally-oriented flange 306 from whose interior end extends a generally upwardly-extending lip 307, so as to define an elongate slot 305. Although the exemplary strut channel 300 as shown in FIG. 3 depicts a lower flange 306 and a lip 307 that are planar and are oriented exactly in vertical and horizontal directions and that meet at right angles, in many cases a holder 304 may comprise a lower flange and/or a lip that are smoothly arcuate, rounded, or the like, e.g. so that the holder exhibits a "J" shape. An anchorage assembly as disclosed herein may be used with any such strut channel, e.g. regardless of the specific design of the holders of the strut channel A strut channel need not have any particular elongate length, as long as it is can admit anchorage assembly 1 thereinto. In fact, in some embodiments a strut channel may take the form of any suitable fixture that is configured (e.g. profiled) to exhibit holders (e.g. each with a lower flange and a lip) so that an anchorage assembly can be installed thereinto in the manner disclosed herein. Such a fixture might be, for example, molded directly into a concrete slab.

Opening (e.g., downward-facing opening) 308 of strut channel 300 will exhibit a width $W_o$; the interior 309 of strut channel 300 will exhibit a width W1 which is wider than width $W_o$, as shown in FIG. 3. In many convenient embodiments, a strut channel 300 may be a nominal 1⅝ inch wide strut channel, which is widely used for many purposes. The 1⅝ inch designation refers to the external width of the strut channel; such a strut channel may comprise a vertical height of e.g. 1⅝ or 1⅜ inch, e.g. with an interior width $W_i$ of 1.41 inches and an opening width $W_o$ of e.g. 0.81 inches. However, strut channels are available in many configurations, shapes and sizes, e.g. so-called junior channels, half channels, and so on. It will be appreciated that the anchorage assemblies disclosed herein may be used with a strut channel of any particular geometry by suitably varying the geometric parameters of the anchorage assembly.

A strut channel may be made of any convenient material, e.g. metal such as steel, stainless steel, and so on. Such a metal may have any suitable coating, finishing, or treatment, e.g. it may be oiled, galvanized, zinc-coated, vapor-coated, powder-coated, coated with thermoset epoxy, painted, and so on. Steel channel may be particularly suited for certain uses disclosed herein. However, a strut channel may be made of any material suitable for a particular purpose, e.g. a lightweight metal such as aluminum, an organic polymeric resin (e.g. a molded, extruded, or pultruded thermoplastic or thermoset material), and so on. In particular embodiments a strut channel may be made of an organic polymeric resin that is reinforced with inorganic fibers. Examples of such arrangements include polyester resins, vinyl esters, or epoxies, that are reinforced with fiberglass.

The base and/or sidewalls of a strut channel may be continuous, or may be periodically interrupted by holes, slots, knockouts, and so on, as desired. In instances in which the strut channel is to be embedded into concrete, the strut channel may have protrusions that extend exteriorly (e.g. upward) from the base of the strut channel and are spaced down the length of the channel, to enhance the holding of the strut channel in the concrete.

Figure 4:
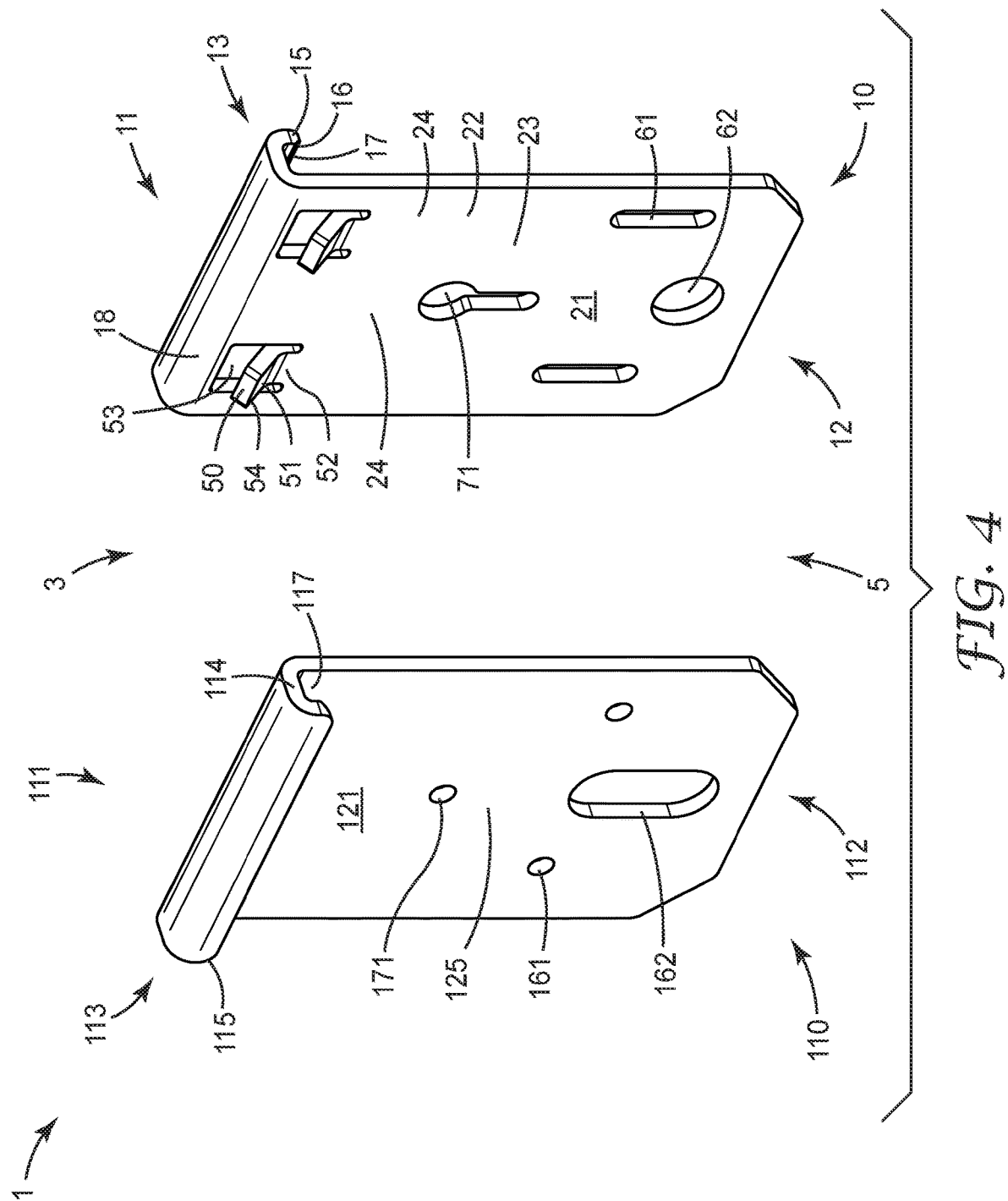
FIG. 4 is a perspective exploded view of an exemplary anchorage assembly.
Figure 5:
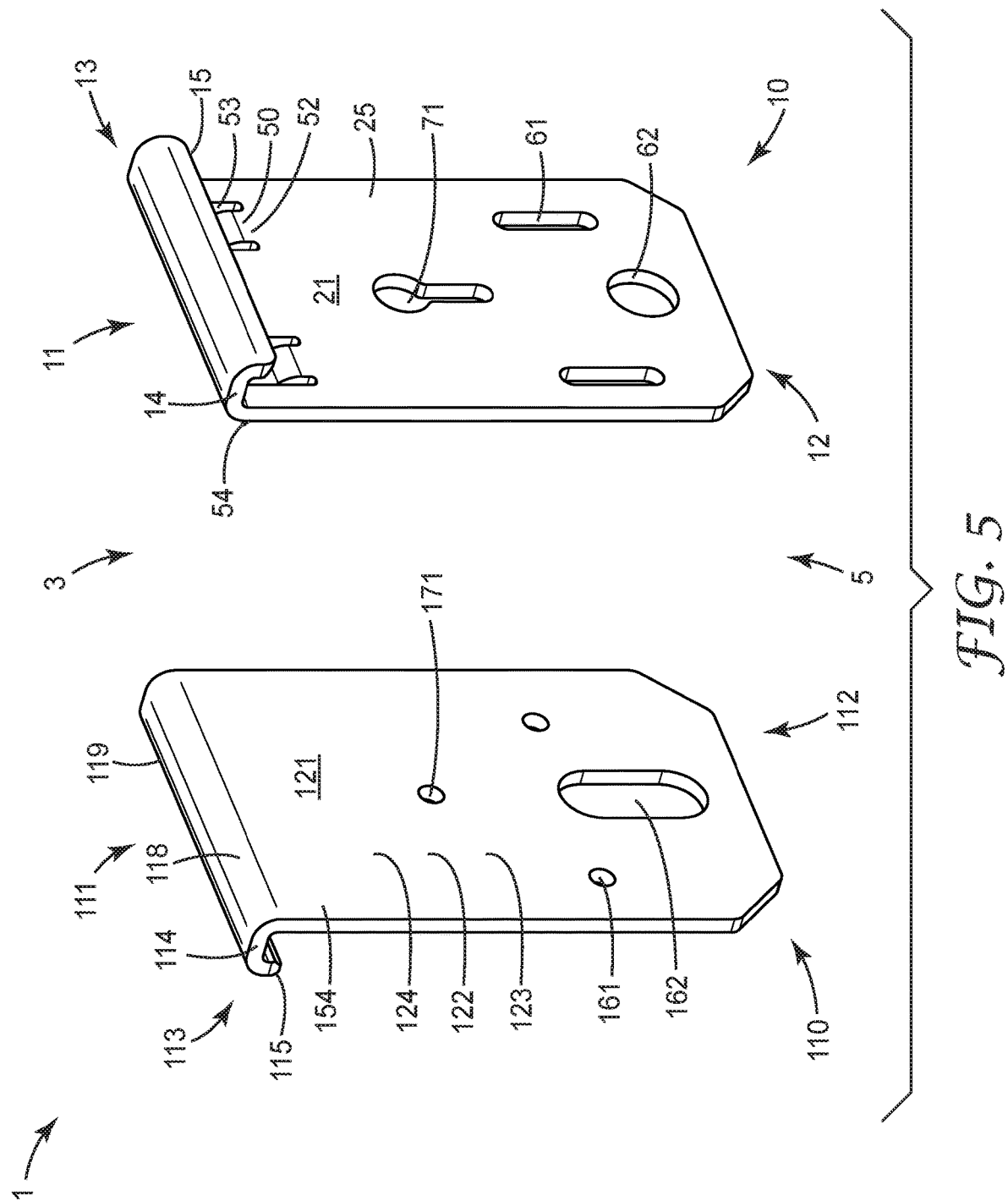
FIG. 5 is a perspective exploded view from a different direction, of the anchorage assembly of FIG. 4.
Figure 6:
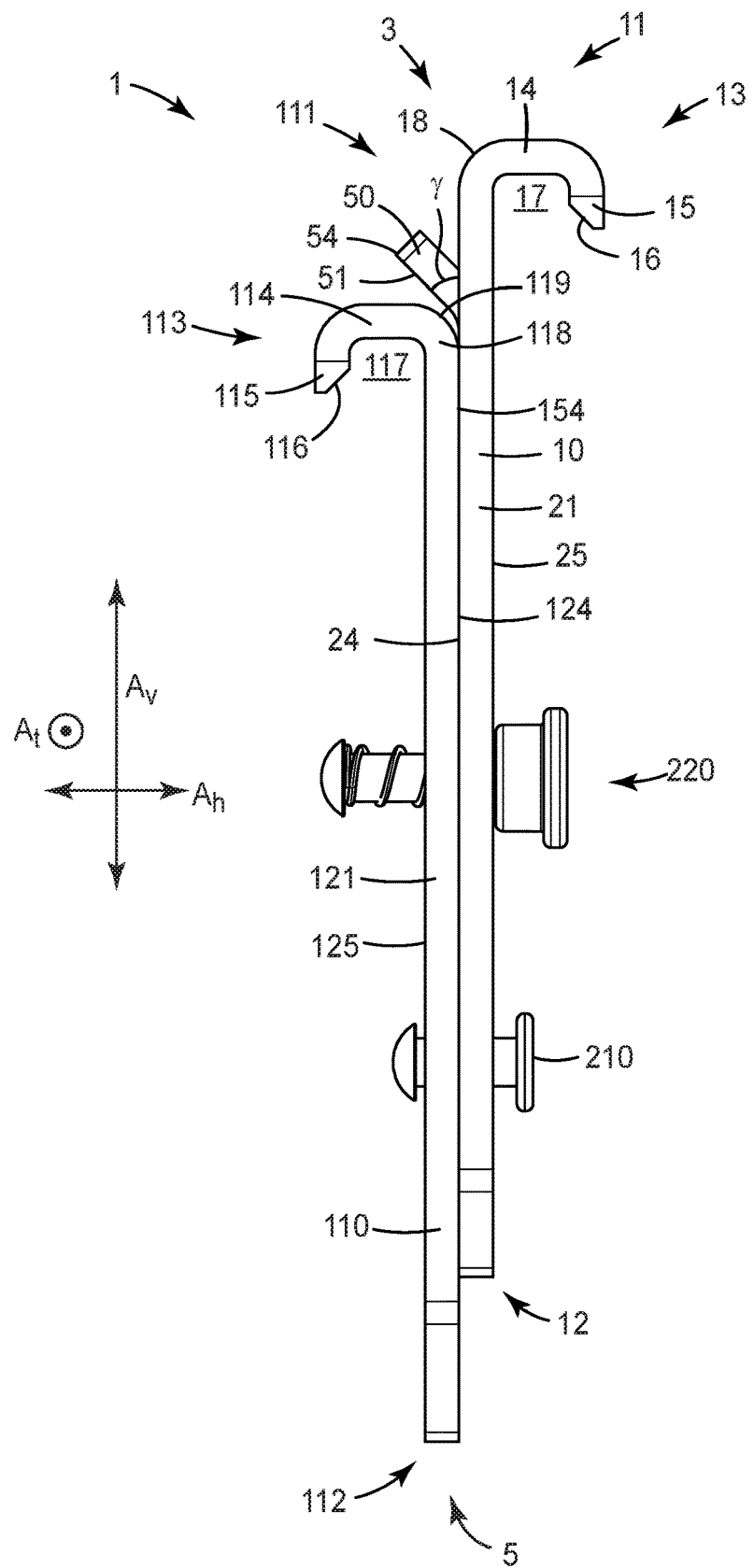
FIG. 6 is an elevation view of an exemplary anchorage assembly in a first, ready position, viewed along the transverse axis of the anchorage assembly.
Figure 7:
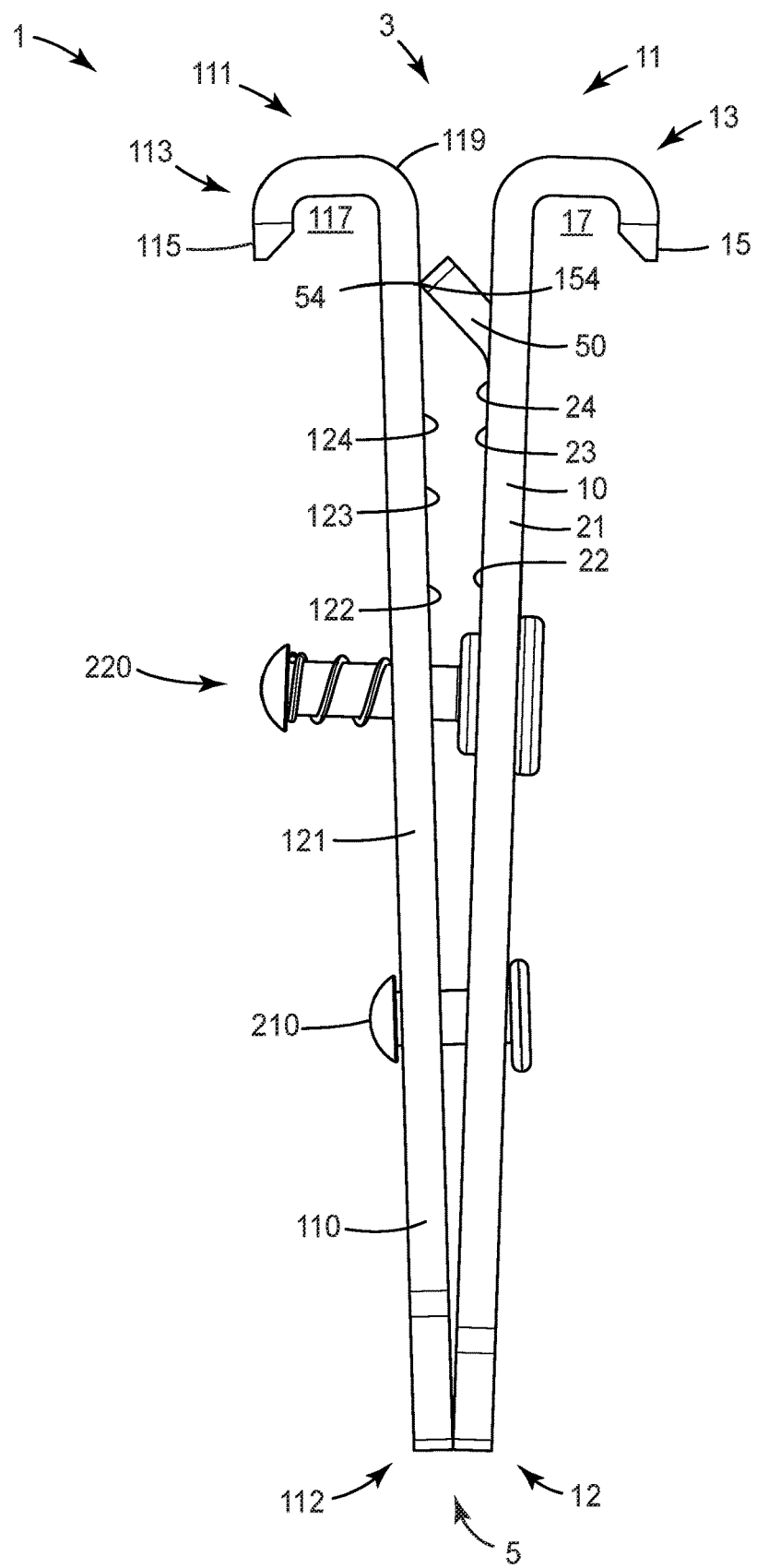
FIG. 7 is an elevation view of the exemplary anchorage assembly of FIG. 6 in a second, installed position.

First and second plates 10 and 110 of anchorage assembly 1 will be described in exemplary embodiment in reference to FIGS. 4-7, noting that FIGS. 4 and 5 are perspective exploded views of the two plates (with retainers and so on being omitted for clarity) and noting that FIGS. 6 and 7 are elevation views, looking along the transverse axis of the anchorage assembly, with the plates in a first, ready position (FIG. 6) and in a second, installed position (FIG. 7).

First plate 10 exhibits an upper end 11 and a lower end 12, and comprises a first main body 21 from which a first upper head 13 extends. First upper head 13 comprises a first flange 14 that extends at least generally outwardly in a first direction. Second plate 110 similarly exhibits an upper end 111 and a lower end 112, and comprises a second main body 121 from which a second upper head 113 extends. Second upper head 113 of second plate 110 comprises a second flange 114 that extends at least generally outward in a second direction that is at least generally opposite the first direction in which first flange 14 extends. Thus in some embodiments, anchorage assembly 1, when installed in a strut channel 300, may be supported by the holders 304 of the strut channel 300 by way of outward ends of flanges 14 and 114 of plates 10 and 110 resting on the upper surface of lips 307 of the strut channel. However, in some embodiments first outwardly-extending flange 14 of first plate 10 may comprise a first lip 15 extending downwardly therefrom; second outwardly-extending flange 114 of second plate 110 may likewise comprise a second lip 115 extending downwardly therefrom, both as depicted in FIGS. 4-7. In such a case anchorage assembly 1, when installed in a strut channel 300, may be supported at least in part by way of the lower tip of lips 15 and 115 resting on the upper surface of flanges 306 of strut channel 300. That is, with such lips being present, lips 15 and 115 of anchorage assembly 1 may reside in elongated slots 305 of strut channel 300, and/or lips 307 of strut channel 300 may reside in elongated slots 17 and 117 of plates 10 and 110 of anchorage assembly 1, e.g. as in FIG. 2. In some embodiments, a lip of a plate may be beveled, chamfered or the like, as with bevel 16 of lip 15 of plate 10. Flanges 14 and 114 and/or lips 15 and 115 may often extend uninterruptedly along a significant portion of the transverse length of the upper end of each plate (e.g., along at least 60, 70, 80, 90, 95, or essentially 100% of this length (as in the exemplary design of FIGS. 4 and 5)). However, in some embodiments any of these may be interrupted periodically and/or may be spaced along the transverse length of the upper end of the plate.

First plate 10 comprises an inward side 22 and an outward side 25; inward side 22 comprises a major surface 23 that, in many embodiments, may be at least generally planar over much of its area (although it may be interrupted by various features, e.g. spreader ramps, through-holes, and so on, as described in detail later herein). Second plate 110 similarly comprises an inward side 122 with a major surface 123, and an outward side 125. First plate 10 comprises an abutment area 24 and second plate 110 comprises a complementary abutment area 124; by abutment areas is meant that these areas will closely abut each other; that is, they will be within 0.5 mm of each other over the entirety of their planar, closest-positioned areas when the first and second plates are in their first, ready position (as in FIG. 6). In many cases areas 24 and 124 will be in contact with each other when the plates are in the first, ready position. Often, abutment areas 24 and 124 will occupy a significant portion of the respective major surfaces 23 and 123. Typically, the interface between abutment areas 24 and 124 of plates 10 and 110 will be the centermost region of anchorage assembly 1 for purposes of establishing inward and outward directions as designated earlier herein.

First plate 10 comprises at least one spreader ramp 50. By a spreader ramp is meant a ramp that is positioned on an upper portion of first plate 10 and that, when the plates are in their first, ready position, protrudes inward. By protrudes inward is meant that spreader ramp 50 extends away from first plate 10 from which it originates, toward second plate 110. (This terminology encompasses certain embodiments in which a spreader ramp extends so far that a portion of it may protrude past a portion of second plate 110 as discussed later herein.) Such an arrangement provides that when second plate 110 is moved upward relative to first plate 10 (e.g. from the position of FIG. 6 to the position of FIG. 7), an interference surface of second plate 110 will impinge on spreader ramp 50 thus forcibly displacing the upper end 111 of second plate 110 away from the upper end 11 of first plate 10. In other words, a spreader ramp 50 acts to spread the upper ends of the two plates apart when the plates are manipulated as disclosed herein.

By positioned on an upper portion of first plate 10 is meant that spreader ramp 50 is positioned so that a linear distance from the lowermost terminus of first plate 10 to an uppermost terminus of ramp 50, is at least 60 percent of the vertical height of plate 10. (In this context the vertical height of plate 10 is the linear distance from the lowermost terminus of first plate 10 to the uppermost terminus of first plate 10; this uppermost terminus will often be supplied by an uppermost surface of flange 14 of upper head 13). In various embodiments, spreader ramp 50 may be configured so that this linear distance is at least 70, 80, 90, or 95 percent of the vertical height the plate. (By way of a specific example, the spreader ramp 50 as depicted in FIGS. 4-7 is configured so that this value is approximately 90%).

Spreader ramp 50 of first plate 10 comprises an inward surface 51 (that faces toward and/or past second plate 110) as shown in FIG. 4; surface 51 is a contact surface that will be impinged on by an interference surface of second plate 110 as the plates are slidably moved relative to each other. Spreader ramp 50 will exhibit a ramp angle alpha (γ), which by definition is the included angle between contact surface 51 and inward major surface 23 of first plate 10. Angle alpha is denoted in FIG. 6; in the exemplary design of FIG. 6 angle alpha is in the range of approximately 45-50 degrees. In various embodiments angle alpha may be at least 15, 25, 30, 35, 40 or 44 degrees; in further embodiments angle alpha may be at most 75, 65, 60, 55, 50, or 48 degrees. In many embodiments spreader ramp 50 will be upwardly angled (e.g. as in FIG. 4), meaning that the distance that spreader ramp 50 protrudes inwardly from first plate 10 increases with the vertical upward distance from the junction of spreader ramp 50 with first plate 10. (In certain specific embodiments, e.g. in which spreader ramps are provided on different plates rather than all being on the same plate, a spreader ramp may be downwardly angled as discussed later herein.)

In the exemplary embodiment of FIGS. 4-5, the at least one spreader ramp 50 takes the form of two spreader ramps that are spaced apart from each other along the transverse axis of first plate 10 and are at least generally equidistant from a transverse centerline of the first plate (such a transverse centerline, if appearing e.g. in FIG. 4, would extend vertically and would pass through through-holes 71 and 62). However, any number of spreader ramps (e.g., 1, 3 or 4) may be used. If only a single spreader ramp is used, in some embodiments it may be transversely centered on first plate 10 and/or it may extend along at least 50, 60, 70, 80, or 90 percent of the transverse extent of plate 10.

In the exemplary embodiment of FIGS. 4-7, an interference surface 119 of second plate 110 is provided at junction 118 of flange 114 with main body 121 of second plate 110. As most easily evident in FIG. 6, interference surface 119 is configured so that upon second plate 110 being slidably moved upward relative to first plate 10, interference surface 119 of second plate 110 will impinge on contact surface 51 of spreader ramp 50 and will be forced outward thus spreading the upper end 111 of second plate 110 outward away from upper end 11 of first plate 10. In some embodiments interference surface 119 may be radiused (e.g. to exhibit a local radius of curvature of at least 3, 5, 7, or 9 mm) to enhance the smoothness with which this occurs. (Junction 18 of first plate 10, although not being an interference surface, may be similarly radiused e.g. to provide symmetry between the upper heads 13 and 113 of the two plates). Whether or not interference surface 119 of second plate 110 is radiused, in some embodiments a junction 52 of ramp 50 with main body 21 of first plate 10 (as visible e.g. in FIG. 4), may be radiused rather than being an abrupt bend or corner. In various embodiments, such a junction may be radiused so as to exhibit a local radius of curvature of at least 1, 2, 3, 4 or 5 mm. Although such features as spreader ramps and contact surfaces thereof, and flanges and lips and interference surfaces of upper heads of plates may thus be arcuate when following the vertical direction and/or the thickness direction of the plate, in many embodiments (e.g. as in FIGS. 4 and 5) such features may be planar when following the transverse direction of the plate.

Comparison of FIGS. 6 and 7 reveals that as second plate 110 slides upward relative to first plate 10, at some point the contact between the upper ends of the two plates will cease to be between contact surface 51 of spreader ramp 50 of first plate 10 and interference surface 119 of second plate 110. Rather, the contact will now be between tip (terminus) 54 of spreader ramp 50 and a contact area 154 of major surface 123 of inward side 122 of second plate 110. As is evident from FIG. 7, tip 54 of spreader ramp 50 of first plate 10 will traverse a path downwardly along contact area 154 of major surface 123 of second plate 110 until reaching a stopping point. A small amount of additional spreading apart of the upper ends of the two plates may occur during this traversal; however, in many embodiments the majority of the spreading may have already been accomplished during the time in which the contact surface of the spreader ramp was in contact with the interference surface of the second plate. However, in some embodiments the plates may be designed so that a significant portion of the spreading does occur while the tip of the spreader ramp of the first plate is traversing a contact surface (e.g. a planar contact surface) of the second plate.

Figure 8:
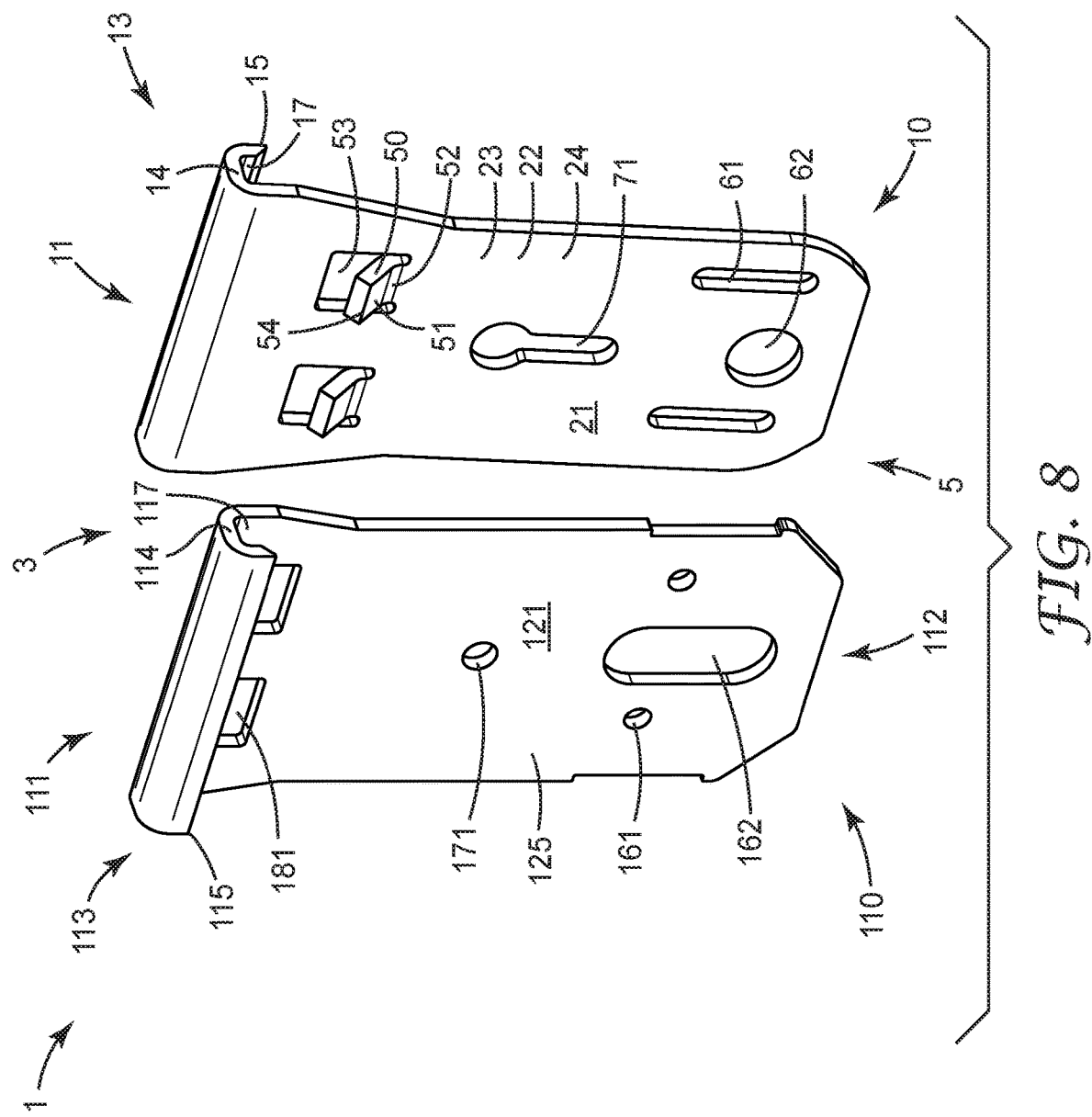
FIG. 8 is a perspective exploded view of another exemplary anchorage assembly.
Figure 9:
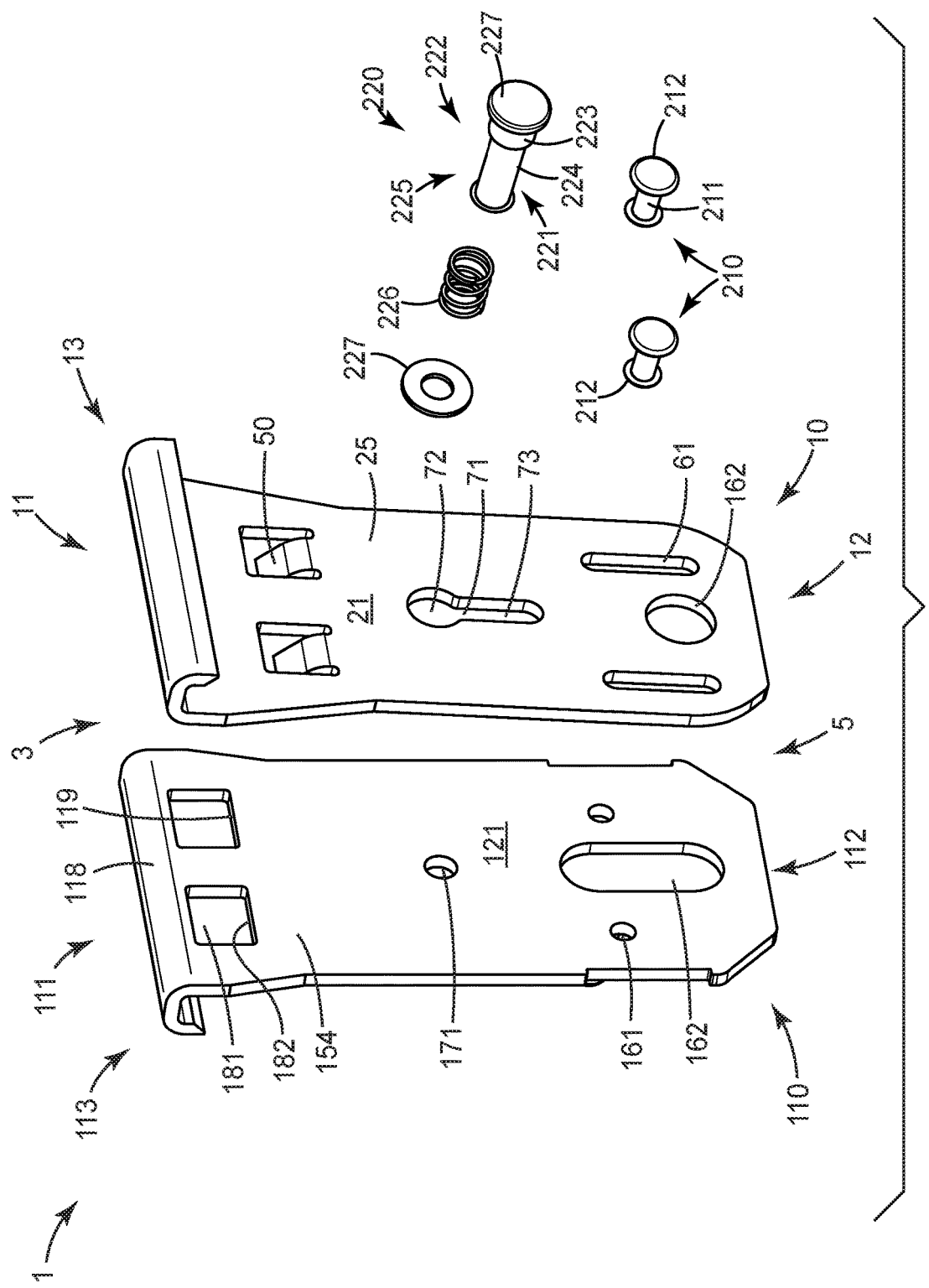
FIG. 9 is a perspective exploded view from a different direction, of the anchorage assembly of FIG. 8.
Figure 10:
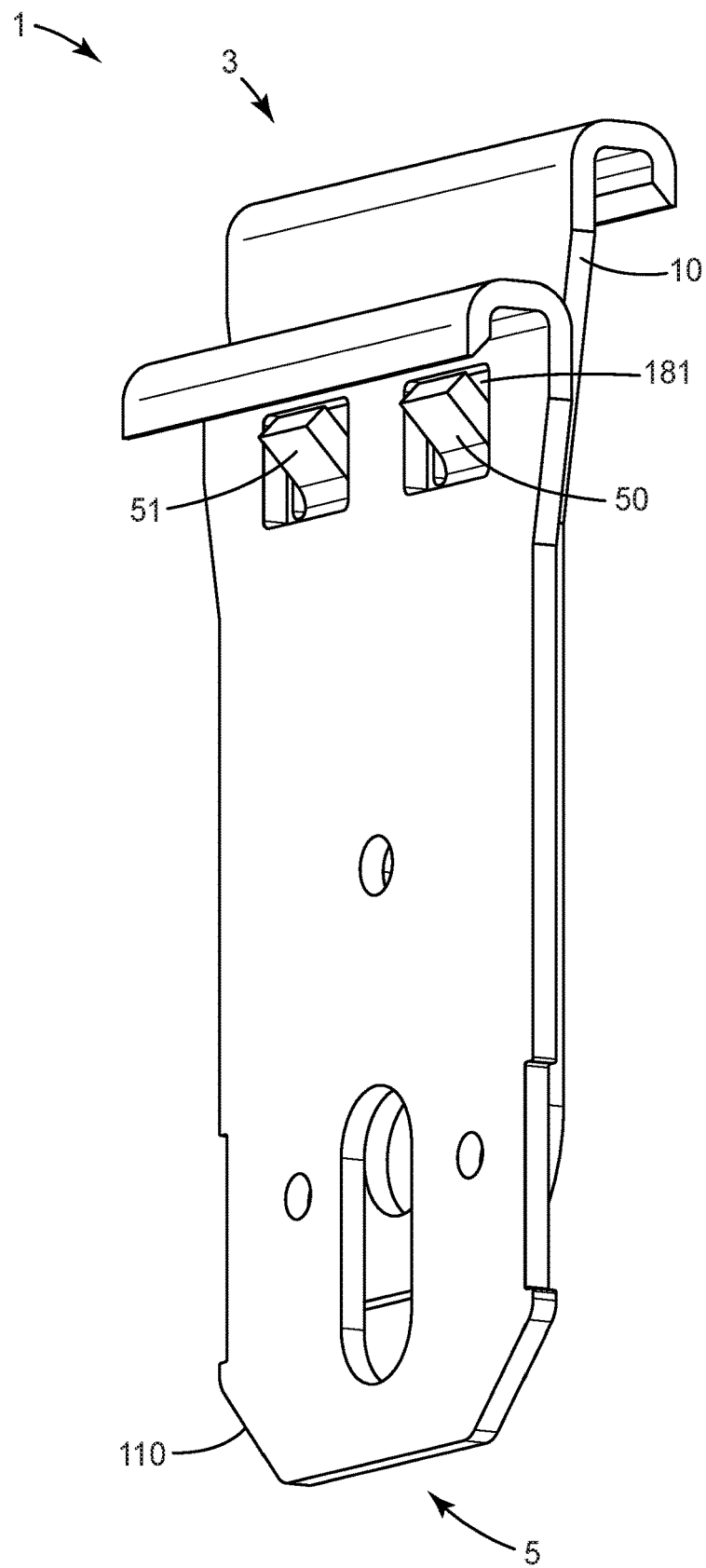
FIG. 10 is a perspective view of the anchorage assembly of FIGS. 8 and 9, in a first, ready position.
Figure 11:
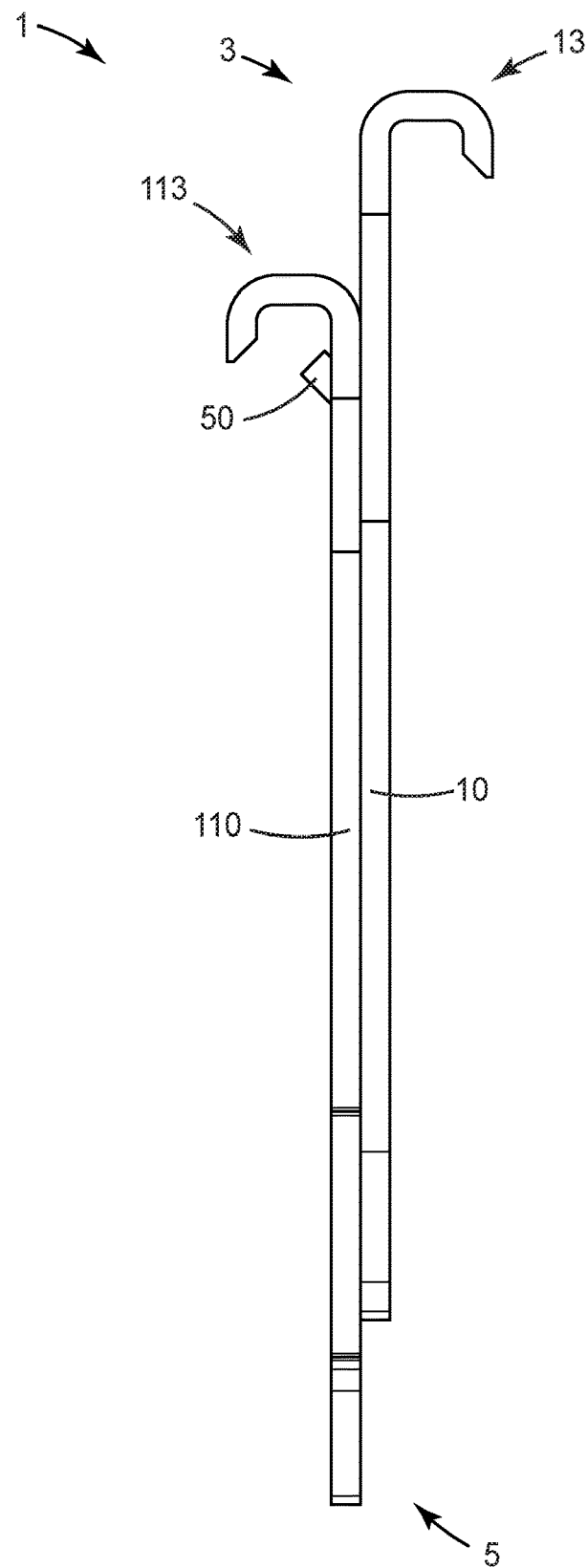
FIG. 11 is an elevation view of the exemplary anchorage assembly of FIG. 10 in a first, ready position.
Figure 12:
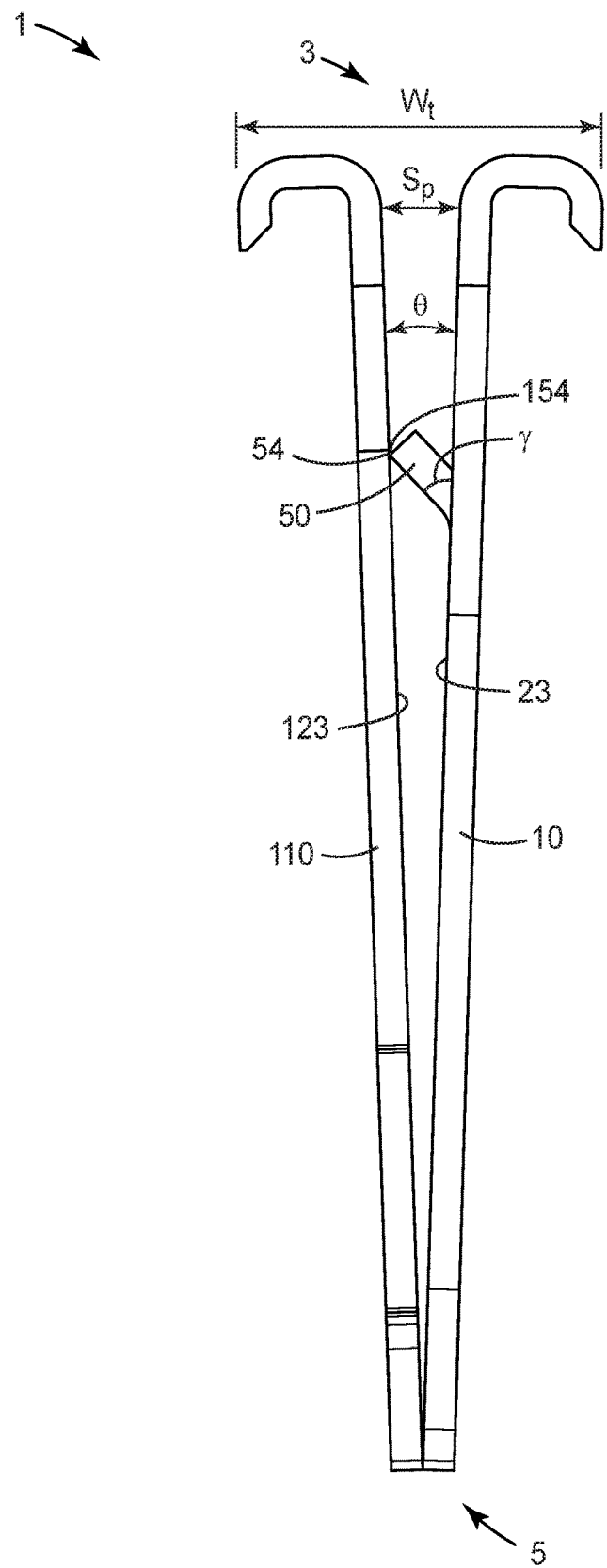
FIG. 12 is an elevation view of the exemplary anchorage assembly of FIG. 11 in a second, installed position.

First and second plates 10 and 110 will be described in an alternative exemplary embodiment in reference to FIGS. 8-12, noting that FIGS. 8 and 9 are perspective exploded views of the two plates (with retainers and so on being omitted from FIG. 8 and being included in FIG. 9), FIG. 10 is a perspective view of the two plates in a first, ready position (again with retainers and so on being omitted), and FIGS. 11 and 12 are elevation views respectively looking along the transverse axis of the anchorage assembly with the plates in a first, ready position and in a second, installed position.

First plate 10 as depicted in FIGS. 8-12 is similar in many respects to first plate 10 as depicted in FIGS. 1-7, the primary difference being that spreader ramps 50 (again two in number) of FIGS. 8-12 are located somewhat vertically lower on plate 10. However, in the exemplary design of FIGS. 8-12, the spreader ramps are still located in the upper portion of the plate. Specifically, in the design of FIGS. 8-12, the linear distance from the bottom terminus of plate 10 to the uppermost terminus of ramp 50 is approximately 80% of the vertical height of plate 10.

Because of the lower positioning of spreader ramps 50 in this embodiment, second plate 110 is provided with complementary ramp-receiving windows (through-holes) 181, that are sized, shaped and positioned so that when the first and second plates are in their first, ready position, a portion of a spreader ramp 50 of first plate 10 resides within a window 181 of second plate 110 that is complementary to (configured to receive) that spreader ramp. (The descriptor of "inwardly-protruding" will still be used to describe such a spreader ramp, even though in some cases a distal portion of the spreader ramp 50 may actually protrude past the outward surface of second plate 110 as evident in FIGS. 10 and 11.)

First and second plates 10 and 110 of this embodiment may be positioned e.g. in the upper portion of second plate 110 and will function according to the general principles outlined above. However, the interference surfaces 119 of second plate 110 with which the contact surfaces 51 of spreader ramps 50 come in contact with upon upward motion of second plate 110 relative to first plate 10, will be provided by lower sill (edge) 182 of windows 181, rather than by the junction 118 of the upper flange 114 with the main body of second plate 110 as in the earlier-described embodiment. If desired, lower sills 182 of windows 181 may be beveled, sloped, radiused, or the like, in order to enhance the smoothness of the spreading process. However, in many embodiments this may not be necessary.

Upon slidably moving the plates away from the first, ready position of FIG. 11, the impingement of interference surfaces 119 of second plate 110 with contact surfaces 51 of spreader ramps 50 of first plate 10 will cause the upper ends of the two plates to spread apart. This will also cause the spreader ramps to exit their complementary windows. Once the plates have been slidably moved sufficiently far that the tip 54 of each spreader ramp has exited its respective window, with any continued slidable movement of the plates the tip will traverse a path downward along a contact area 154 of major surface 123 of second plate until reaching a stopping point, in the general manner described above.

Whether in a design of the type shown in FIGS. 4-7 or of the type shown in FIGS. 8-12, the design, number and location of spreader ramp(s) 50 may be varied as desired. It will be appreciated that the effects described herein may be achieved e.g. by a spreader ramp that exhibits a somewhat lower angle alpha and/or that does not extend as far away from the main body of the first plate. For example spreader ramp that is e.g. less-inwardly-protruding and/or lower-angle might be positioned lower on the first plate (e.g. while still remaining in the upper portion of the first plate as discussed earlier) while still achieving similar effects. It will also be appreciated that a contact surface 51 of a spreader ramp 50 need not be necessarily essentially or exactly planar, or exhibit a constant angle alpha, as it does in the exemplary design of FIGS. 4-7. For example, a contact surface of a spreader ramp could be slightly bowed, concave, convex, etc. In such cases an angle alpha will be measured as an average over the extent of the contact surface of the spreader ramp.

Although windows 181 are depicted in FIGS. 8-10 with all material having been completely removed from them, it will be appreciated that all that may be necessary is to provide sufficient space for the distal end of a spreader ramp 50 to protrude into and/or through a portion of the window. Thus in some embodiments, a window of a plate may be a tabbed window that comprises an outwardly-protruding tab that is joined to the plate at an integral junction therewith, e.g. at a lowermost edge of the tab and window. Such a tab may resemble a spreader ramp 50 (except that it protrudes outward, away from the other plate, rather than inward toward the other plate). In some embodiments such a tab may be angled or otherwise configured so that at least a portion of an inward major surface of the tab is complementary to at least a portion of the contact surface 51 of the spreader ramp 50. In such a case this portion of the inward surface of the tab may act as an interference surface 119 with a function as described above.

In embodiments in which multiple spreader ramps (e.g., two) and complementary windows are present, it may not be necessary that the spreader ramps will all be on one plate with the windows being all on the other plate in the general manner shown in FIGS. 8-12. Rather, in some particular embodiments each plate may have at least one spreader ramp and at least one window configured to receive a spreader ramp of the other plate. In such a case the spreader ramps will each protrude inwardly (i.e. toward the other plate) as described above. However, one such ramp may be downwardly angled (rather than upwardly angled in the manner of ramps 50 of FIGS. 8 and 9) with the other ramp being upwardly angled. In such a case it may be useful that the junction of the downwardly-angled ramp with its plate be vertically offset from (e.g. positioned vertically higher than) the junction of the upwardly-angled ramp with its plate. (The complementary windows may be vertically offset from each other to the extent necessary to accommodate this arrangement). This can provide that when the plates are in their second, installed position in which the tip 54 of each spreader ramp has reached its final stopping point on the contact surface of the opposing plate, the tips of the ramps will be at least substantially, or essentially, vertically even with each other.

As noted earlier with regard to FIGS. 1 and 2, first and second plates can be slidably moved from a first, ready position into a second, installed position. This process will now be described in detail, with regard to FIGS. 6 and 7 (and similar FIGS. 11 and 12). Disregarding for now the presence of various retainers and so on, which will be described later, with first plate 10 and second plate 110 in their first, ready configuration, second upper head 113 of second plate 110 is positioned lower than first upper head 13 of first plate 10, as in FIG. 6. With first plate 10 and second plate 110 in their second, installed position, second upper head 113 of second plate 110 is positioned at least generally at the same height as first upper head 13 of first plate 10, as in FIG. 7.

In this instance the term height refers specifically to the vertical location of a force-transmitting structure of an upper head of a plate, when the plate is in its second, installed position. The force-transmitting structure will typically be whichever portion of the upper head contacts a holder of a strut channel in such manner as to transmit a load. In the embodiment of FIGS. 4-7 the force-transmitting structure of upper head 13 of first plate 10 may be the bottom tip of lip 15 (if this tip rests on the floor of flange 306 of the strut holder). Or, the force-contacting structure may be the underside of flange 14 of first plate 10 (if this surface of flange 14 is contacted by the upper tip of lip 307 of the strut holder). In some embodiments, both such structures may act in combination.

The requirement that second upper head 113 of second plate 110 is positioned at least generally at the same vertical height as first upper head 13 of first plate 10 thus means that the force-transmitting structures of the two plates will be at at least generally the same vertical height. In further embodiments, these two vertical heights may be at least substantially or essentially the same. Such arrangements can ensure that any load that is placed on anchorage assembly 1 and on strut channel 300 is distributed evenly to the two plates of the anchorage assembly and to the two sides of the strut channel. In some embodiments, all corresponding portions of first upper head 13 and second upper head 113 may be at the same vertical location when the plates are in their second, installed configuration. For example, the first and second upper heads may be oppositely-facing mirror images e.g. as in FIGS. 4-7. However, this may not be strictly necessary; e.g., a flange 14 of first plate 10 may be bowed upward so that a portion of it resides at a higher vertical location than a flange 114 of second plate 110.

As is evident from FIG. 7, when the first and second plates are in their second, installed position, the upper end 111 of second plate 110 (in fact, much of the vertical extent of both plates, excepting e.g. a small area at the lower end of the plates) is displaced outwardly away from the upper end 11 of first plate 10. This can be contrasted with the first and second plates when in their first, ready position as in FIG. 6. This difference may be characterized in terms of a spreading angle theta (θ) as illustrated in FIG. 12. As defined herein, a spreading angle theta will be measured between inward major surfaces 23 and 123 of first and second plates 10 and 110, from a vertex at the lower end 5 of anchorage assembly 1. In various embodiments, spreading angle theta may be at least 1.5, 2.0, 2.5, 3.0, or 3.5 degrees. In further embodiments spreading angle theta may be at most 10, 8.0, 6.0, 5.5, 5.0, 4.5, or 4.0 degrees. (By way of a specific example, the spreading angle theta for the exemplary anchorage assembly of FIG. 12 is approximately 4 degrees).

Although such angles may seem small, they are in fact large in comparison to the "angle" that exists between major inward surfaces 23 and 123 when the plates are in their first, ready position. When the plates are in this first, ready position these surfaces will be parallel to each other to within 1.0 degree or less. It will be appreciated that a change from a first, ready configuration in which these surfaces are parallel to each other to within e.g. 1.0, 0.5, or even 0.2 degrees, to one in which they exhibit a spreading angle of at least 1.5, 2.0, 3.0 degrees or more, can provide sufficient spreading of the upper ends of the plates to achieve the objects disclosed herein.

The displacement of the upper ends of the plates can also be characterized in terms of a plate spacing. As defined herein, a plate spacing is the linear distance between major surface 23 of first plate 10 and major surface 123 of second plate 110, measured at the uppermost location at which these surfaces are still planar (e.g. the highest location before each plate begins to bend outward to form flanges 14 and 114). An exemplary plate spacing $S_p$ is depicted in FIG. 12. This plate spacing may comprise any value commensurate with installation into a particular strut channel (e.g. from at least 3, 4, 6, or 8 mm, to at most 16, 14, 12 or 11 mm). This plate spacing may be further characterized by obtaining a plate spacing ratio, which is the ratio (expressed in percent) of the plate spacing to the total width of the anchorage assembly at its upper end when the anchorage assembly is in its second, installed position. (The total width $W_t$ is depicted in FIG. 12). In various embodiments, this plate spacing ratio may be at least about 10, 12, 14, 16, 18 or 20%. In further embodiments, this plate spacing ratio may be at most 40, 35, 30, 25, or 22%. (By way of a specific example, the plate spacing ratio for the exemplary anchorage assembly of FIG. 12 is about 20%).

First and second plates 10 and 110 can be made of any suitable material. In particular embodiments such a plate can be made of steel, e.g., stainless steel such as grade 304 steel, galvanized steel, or the like. In other embodiments the plate may be made of a lightweight metal such as e.g. aluminum. In other embodiments the plates may be made of an organic polymeric resin, e.g. a molded, extruded, or pultruded thermoplastic or thermoset material. In particular embodiments the plate may be made of an organic polymeric resin that is reinforced with inorganic fibers (e.g. fiberglass). Examples of such arrangements include fiberglass-reinforced polyester resin, vinyl ester, or epoxy.

Such a plate may be made using any suitable manufacturing process. In various embodiments, the plate may be made by e.g. machining a block of metal, by forging, and so on. In particularly convenient embodiments, the plate may be produced by starting with a flat layer of suitable material (e.g. sheet steel of 1/16, 1/8, or 3/16 inch thickness). The flat layer of material may be cut (e.g. by laser-cutting) to provide an shaped piece with an outer perimeter. The flat layer of material may then be controllably deformed (bent), e.g. by suitable metal-forming methods, to form an upper head. The bending may be carried out in a single step, or in a series of steps. The layer of material may be cut e.g. to provide various through-holes as discussed herein. (While this cutting may be done after a bending process, in many embodiments it may be convenient to carry out such through-hole-cutting steps while the layer is still in flat form, e.g. in concert with the process of cutting the plate to form its outer perimeter). If the plate is a molded organic polymeric material, the upper head may be molded as an integral protrusion of the plate. In some embodiments, a separately-made upper head may be attached to a plate e.g. by adhesive bonding, welding or soldering, solvent welding, and so on.

At least one such plate is equipped with a spreader ramp as discussed in detail herein. In some embodiments such a spreader ramp may be a separately-made component that is mounted on a plate (e.g. onto a major surface thereof) by additive methods. For example, a separately-made spreader ramp might be welded onto the surface of the plate, might be attached to the plate e.g. by adhesive bonding, by welding, soldering, or solvent welding, and so on. If the plate is a molded organic polymeric material, the spreader ramp may be molded as an integral protrusion of the plate.

In many embodiments (e.g. in which the plate is made of a metal such as steel) it may be convenient to produce a spreader ramp by cutting a generally U-shaped through-hole through the thickness of the plate. Within the through-hole, and bounded by it on three sides, remains a tab that is comprised of the same material as the plate and that is joined to the plate at an integral junction therewith. The tab can then be subjected to a metal-bending process to form a spreader ramp, e.g. of the general type depicted in FIG. 4. Any suitable number of spreader ramps may be provided in this manner. (If a window of a plate is a tabbed window as described earlier herein, such a tab may be produced by steps similar to those described for forming a spreader ramp.)

A spreader ramp may exhibit any suitable shape; e.g. it might be generally triangular rather than rectangular as shown in FIG. 4. For example, a V-shaped cut may be made in the plate, with the apex of the V uppermost, with the resulting tab being bent about an axis that extends across the lower, open end of the V to form the spreader ramp. The resulting triangular spreader ramp may resemble e.g. a can-piercing portion of a "church key" can opener. In some embodiments, a spreader ramp may be formed by bending a tab about an axis that is generally aligned with the vertical axis of the plate, rather than bending about an axis that is generally aligned with the transverse axis of the plate as would lead to a spreader ramp of the general type illustrated in FIG. 4. In such a case, a contact surface of the ramp may be provided by a minor edge surface of the ramp rather a major surface as in the design of FIG. 4. Such a bendable tab may be provided e.g. by making a generally V-shaped cut in the plate with the open end of the V being oriented generally along the vertical axis of the plate. The tab can then be bent about an axis that extends across the open end of the V to form a spreader ramp. In a variation of this, a plate can be cut from a sheet so that, when the sheet is in its initial, flat form, first and second triangular tabs extend from first and second transverse perimeter edges of the plate. Each tab can each be bent about an axis that extends generally along the vertical axis of the plate (e.g. that is generally aligned with the transverse edge of the plate), to provide first and second spreader ramps at first and second transverse edges of the plate. It will be appreciated that many variations in the design of spreader ramps are encompassed by the disclosures herein. Moreover, a tab, having been bent to form a spreader ramp, can be post-processed, shaped, etc., as desired. For example, in the case of a generally triangular "church key" type spreader ramp, a terminal end of the spreader ramp may be worked, abraded, smoothed, chamfered, beveled, or the like, e.g. to provide that the ramp does not terminate in a sharp tip.

It will be clear from these discussions that in some embodiments a plate as disclosed herein, including e.g. an upper head and a spreader ramp if present, may be an integral body (e.g. made by bending and cutting of one flat sheet of material). To this integral body may be added various separately-made components (e.g. retainers, locks, and so on), as discussed below. Thus, in some embodiments a spreader ramp will be integrally joined to a main body of the plate by an integral junction. An integral body, an integral protrusion, an integral joining or junction, and like terms, denotes a condition in which the referred-to components are portions of a single, unitary body and in which all the components are comprised of the same material. Such an arrangement specifically excludes any arrangement in which a separately-made component is attached to a plate or is added to a plate by additive manufacturing methods.

A plate (made of e.g. stainless steel) may have any suitable coating, finishing, or treatment, e.g. it may be oiled, galvanized, zinc-coated, vapor-coated, powder-coated, coated with thermoset epoxy, painted, and so on. In some embodiments, at least portions of a major surface of a plate (e.g. a lower portion of an outward major surface of the plate) may be textured (e.g. by knurling), may have a non-slip coating or treatment applied to, and so on, to enhance the ease with which a user can grasp the plate to perform the manipulations disclosed herein.

In some embodiments, first plate 10 and second plate 110 that collectively provide anchorage assembly 1 may be provided as separate components that are not connected to each other (although they may become connected to each other e.g. when an item that is to be supported by the anchorage assembly is fastened to each plate). In other embodiments, first plate 10 and second plate 110 are connected to each other by one or more retainers. Exemplary retainers 210 that may be used for such a purpose are shown in elevation view in FIG. 6 and in perspective exploded view in FIG. 9. Any such retainer may be detachable from at least one of the plates so that the plates may be separated from each other; however in many embodiments such a retainer may connect the plates to each other in a non-separable manner. By non-separable is meant that the plates cannot be separated from each other in ordinary use of anchorage assembly 1 without destroying or damaging any or all of the plates and the retainer(s).

Any such retainer must allow slidable vertical movement of the two plates relative to each other. One exemplary arrangement is most easily seen in FIG. 9. Retainer 210 as depicted therein comprises an elongate shank 211 and enlarged ends 212 (one of which ends may be formed after the retainer is in place on the plates). Shank 211 passes through a retaining aperture 161 in second plate 110 and through a retaining aperture 61 in first plate 10. The retaining aperture 161 and the retaining aperture 61 will be sufficiently aligned with each other to allow this. Retaining aperture 61 is in the form of a slot that is elongated at least generally along the vertical axis of plate 10 to allow the plates to vertically slide relative to each other while still remaining connected to each other by retainer(s) 210.

Any such retainer should allow the first and second plates to spread apart from each other at least to an amount to allow the functioning described herein. In the exemplary depicted embodiments, the retainers are mounted in the lower portion of the plates. While the spreading that occurs in the lower portion of the plates will be less than the spreading that occurs at the upper end of the plates, retainers positioned in the lower portion of the plates may nevertheless still allow at least some amount of spreading. In the depicted embodiment this is achieved by providing that the elongate length of retainers 210 (e.g., the distance between the two enlarged heads 212) is at least as great as the local distance that will exist between the outward surfaces of the two plates when the plates are in their second, installed position. Such an approach can be readily appreciated from inspection of FIG. 7. In other embodiments, a retainer might be e.g. expandable along the thickness direction of the two plates to allow plate spreading to occur.

Any retainer, of any design, may be used as long as it permits the desired plate-spreading. As noted above, in some embodiments such a retainer may be a component that is made separately from plates 10 and 110 and is then installed thereonto. In the exemplary design of FIG. 9, retaining apertures 161 are in second plate 110 and retaining slots 61 are in first plate 10; however, these locations could be switched; or, each plate could comprise one retaining aperture and one retaining slot. If one aperture/slot pair are provided, it may be convenient to center them transversely on the plates; if multiple pairs are provided, it may be useful for them to bracket the transverse centerline of the plates, e.g. as in the exemplary design of FIG. 9.

In some embodiments anchorage assembly 1 may include one or more locks that is engagable to lock first plate 10 and second plate 110 in their second, installed position. Such a lock may be configured that, when the lock is engaged, it prevents the first and second plates from vertically slidably moving relative to each other out of the second, installed position and into a first, ready position. In some embodiments the lock may be manually engaged once the plates are in their second, installed position. In other embodiments the lock may be configured so that it automatically engages upon slidable vertical movement of the first and second plates from the first, ready position to the second, installed position. In further embodiments the lock may be configured so that the lock must be manually disengaged in order to allow the first and second plates to be slidably vertically moved from the second, installed position to the first, ready position.

Any suitable lock, of any design or configuration, may be used for such purposes. An exemplary lock 220 is shown in FIG. 9. Lock 220 is configured to work in concert with a lock aperture 171 of second plate 110 and a keyhole aperture 71 of first plate 10. Keyhole aperture 71 comprises a vertically-elongated slot portion 73 this is upwardly-joined to a circle portion 72 that has a transverse width that is larger than the transverse width of slot portion 73 (noting that the term circle portion is used for convenience of description and that portion 72 need not be strictly circular).

Exemplary lock 220 comprises an elongate member 221 comprising a shank 224. Member 221 comprises a first longitudinal portion 222 that passes through keyhole aperture 71 of first plate 10 when the plates are in their first, ready position. First longitudinal portion 222 comprises an expanded-diameter shoulder 223 that is sized to fit within circle portion 72 of keyhole aperture 71 but that is too large to fit within slot portion 73 of keyhole aperture 71. Elongate member 221 comprises a second longitudinal portion 225 that passes through lock aperture 171 of second plate 110. Lock 220 comprises enlarged heads 227 to retain lock 220 on anchorage assembly 1 (in the depicted embodiment, one enlarged head 227 is a washer that is held in place by an enlarged diameter lip on the end of second longitudinal portion 225).

Lock 220 is configured so that when first and second plates 10 and 110 are in their first, ready position, the inward, shoulderless part of first longitudinal portion 222 of elongated member 221 resides within slot portion 73 of keyhole aperture 71 of first plate 10; second longitudinal portion 225 of elongated member 221 resides within lock aperture 171 of second plate 110. As the plates are slidably moved relative to each other, first longitudinal portion 222 slides upward within slot portion 73 of keyhole aperture 71 until it reaches circle portion 72 of keyhole aperture 71. At this time at least first longitudinal portion 222 of elongated member 221 can then be urged along the thickness direction of the plates, so that expanded-diameter shoulder 223 enters, and resides snugly within, circle portion 72. In some embodiments this may done manually e.g. by way of lock 220 being manipulated by a user of anchorage assembly 1. However, in the exemplary depicted embodiment, this is performed automatically when second plate 110 has slidably moved sufficiently far upward relative to first plate 10. This may be achieved by providing a biasing element (in this case, a compression spring, as seen most easily in FIG. 9) 226 that urges elongated member 221 in the appropriate direction along the thickness axis of the plates. This can provide that as soon as elongated member 221 has moved sufficiently far upward along keyhole aperture 71 that shoulder 223 of member 221 is able to fit within circle portion 72, the biasing member will cause should 223 to enter, and reside in, circle portion 72. Lock 220 will then be in a locked configuration of the type shown in FIG. 7, with shoulder 223 preventing elongated member from moving downward into slot portion 73.

Thus in the depicted embodiment, lock 220 will automatically engage to lock the plates upon the plates being slidably moved into their second, installed position. In the depicted embodiment, in order to slidably move the plates back into the first, ready position, it will be necessary to manually urge elongated member 221 in a direction opposite that described above (e.g. by pressing on the end of elongated member 221 that bears washer 227) so that expanded-diameter shoulder 223 is positioned outward of second plate 110 so that shoulder 223 no longer prevents elongated member 221 from slidably moving downward into slot portion 73.

In like manner to the above-described retainer(s), any such lock will be configured so that it allows the first and second plates to spread apart from each other to the extent necessary. It will be appreciated that lock 220 as depicted herein is merely one exemplary arrangement and that any suitable lock, whether auto-engaging or requiring manual engaging, and whether auto-disengaging or requiring manual disengagement, can be used. In some embodiments, e.g. in which it is desired to install an anchorage assembly 1 permanently into a strut channel, such a lock may not be disengagable, either manually or automatically. In some particular embodiments, any such lock may serve as a retainer that at least assists in retaining the first and second plates together. In some particular embodiments, such a lock may serve this purpose so that no additional retainers (e.g. retainers 210 as described above) are needed.

Anchorage assembly 1 is configured to be installed into a strut channel 300 and to facilitate the attachment of an item to the anchorage assembly so that the item is supported by the installed anchorage assembly. The term "item" broadly encompasses any entity, apparatus, system, collection of components, and so on, that is desired to be attached and supported in this manner, as discussed in detail later herein. In some embodiments, to facilitate such attachment an anchorage assembly may be provided with a first attachment orifice 62 in first plate 10 and a second attachment orifice 162 in a second plate 110. The attachment orifices are aligned with each other and are sized and shaped to allow a fastener to pass through the aligned attachment orifice (noting that this does not necessarily require that all portions of the orifices are exactly aligned with each other). In some embodiments, at least one of the attachment orifices (in the exemplary depiction of FIG. 9, attachment orifice 162 of second plate 110) may be a vertically elongated slot along which the fastener is free to slidably move. It will be appreciated that this may be provided so that the fastener does not prevent the first and second plates from being vertically slidably moved relative to each other if the fastener is already present when anchorage assembly 1 is installed. In like manner to the above-described retainer(s), any such fastener, and the attachment orifices with which it functions, will be configured so that it allows the first and second plates to spread apart from each other to the degree necessary. In general, an anchorage assembly 1 may be configured in any suitable manner to accept any fastener that can be used to attach an item to the anchorage. In some embodiments, an anchorage assembly may comprise a single attachment orifice in one plate, with the other plate not comprising an attachment orifice.

In some embodiments such a fastener may be e.g. a carabiner 7 or like device (as shown e.g. in FIGS. 1 and 2); such a fastener may be used e.g. to attach a safety line to anchorage assembly 1. In particular embodiments such a safety line may be a so-called self-retracting lifeline (SRL). In such a case a housing of the SRL may be directly attached to the carabiner; or, an tether, line, cable or the like may be attached to anchorage assembly 1 with the housing of the SRL being attached to the tether.

As disclosed herein, an anchorage assembly 1 may be maintained in a first, ready position until it is to be installed e.g. into an overhead-mounted, downwardly-facing strut channel 300. At that time, the upper end 3 of anchorage assembly 1 can be inserted upward through opening 308 of strut channel 300. The total width of the upper end of the anchorage assembly (with anchorage assembly in its first, ready configuration) will be sufficiently small in comparison to the width $W_o$ of opening 308 of strut channel 300, to allow this to be performed. In some embodiments the total width of the upper end of the anchorage assembly will be sufficiently smaller than the width $W_o$ of opening 308 that the upper end of the anchorage assembly may be passed straight upwards through opening 308. In other embodiments the total width of the upper end of the anchorage assembly width may be such that the anchorage assembly may be angled slightly to one side and then to the other side to facilitate passing the upper end of the anchorage assembly through opening 308.

Once the upper heads 13 and 113 of first and second plates 10 and 110 are within interior 309 of strut channel 300, first and second plates 10 and 110 can be slidably vertically moved relative to each other so that they move out of their first, ready position and into their second, loading position. While the concept of relative movement of the plates encompasses moving the first plate downward relative to the second plate, or moving both plates, in some embodiments this relative movement may involve primarily moving the second plate upward relative to the first plate. In practice this may be conveniently achieved by moving anchorage assembly 1 upward until upper end 11 of first plate 10 (e.g. an upper surface of flange 14) contacts the ceiling 302 of base 301 of strut channel 300. At this point no further upward movement of first plate 10 is possible and continued upward urging of anchorage assembly 1 will cause second plate 110 to slide vertically upward relative to first plate 10 to put the plates in their second, installed position. (Since the upper end of first plate 10 will have contacted the ceiling of the strut channel base, the upper end of second plate 110 will not be able to be positioned higher than the upper end of first plate 10.) A lock, if present, may auto-engage, or be manually engaged, at this point. After the plates have been put into their second, installed position, the entire anchorage assembly may be lowered slightly to a position in which the upper heads of the plates are engaged with the holders of the strut channel (that is, to a position as shown in FIG. 2).

During installation of anchorage assembly 1 into a strut channel 300, anchorage assembly 1 may be held in the hand of a user; it may be most convenient for the use to grasp a lower portion of anchorage assembly 1. It will be appreciated that with the plates in their first, ready position, the lowermost end of second plate 110 may be positioned lower than the lowermost end of first plate 10 (as is evident from e.g. FIG. 6). It will thus be straightforward to push upward on the lower end of second plate 110 (e.g., a user may push upward on the lowermost edge of second plate 110) in order to slide second plate 110 into the second, installed configuration.

If it is desired to uninstall an anchorage assembly from a strut channel, the above procedures may be reversed. In many embodiments a lock may be manually disengaged as part of this process. It will be appreciated that in many embodiments, first and second plates 10 and 110 may remain at least generally transversely aligned with each other during all steps of the installation process (e.g. as shown in the exemplary embodiments of FIGS. 1 and 2). This may be contrasted with, for example, an arrangement in which first and second plates are inserted into a strut channel in a misaligned configuration (e.g. at separate locations along the length of the strut channel), and are then slidably moved along the channel into transverse alignment with each other in order to connect the plates to each other to form an anchorage assembly.

In some embodiments, anchorage assembly 1 may be provided with first and second visual indicators 204 that can be visually inspected to ensure that anchorage assembly 1 has been properly installed in a strut channel. As shown in exemplary embodiment in FIGS. 10 and 11, a first visual indicator 204 may be provided on an outward area 205 of an underside of first outwardly-extending flange 14 of first upper head 13 of first plate 10. A second visual indicator 204 may be similarly provided on an outward area of an underside of second outwardly-extending flange 114 of second upper head 113 of second plate 110. One or both of these visual indicators will be visible from below when the upper heads of the plates have been inserted upward through opening 308 of strut channel 300 but without the upper heads of the plates having yet been spread outwardly into their installed position. After the upper heads of the plates have been spread outwardly and the anchorage assembly lowered so that the upper heads of the plates are engaged with the holders of the strut channel, inward portions of the holders (e.g. lips 307) will obscure the visual indicators (when viewed from below) so that they are no longer visible. This can be taken as an indication that the anchorage assembly has been appropriately spread into its installed position and engaged with the strut channel.

A visual indicator 204 can be configured in any suitable manner. The width of an indicator 204 along the thickness axis of the anchorage assembly, and its placement along this axis, can be chosen to provide that the indicator is visible prior to becoming engaged with the strut channel and becomes obscured after a successful installation. While exemplary indicators 204 as pictured in FIG. 10 extend continuously along the entire elongate length of outward area 205 of each respective flange of each plate, such indicators may be discontinuous and/or may be disposed only along a portion of the elongate length of outward area 205 of the flange. The indicators may be substantially identical to each other, or they may be different from each other.

A visual indicator 204 can comprise any material or treatment that will appropriately provide sufficient visibility, e.g. when examined under ambient-light conditions and/or when interrogated with a flashlight. In some embodiments, a visual indicator may take the form of one or more pieces (e.g., elongate lengths) of material that exhibit suitable visibility. In some convenient embodiments, such an indicator might take the form of an elongate length of high-visibility (e.g. brightly colored) pressure-sensitive-adhesive tape that is adhesively attached to the desired area 205 of the underside of the flange. However, any desired attachment method may be used. For example any suitable adhesive (whether e.g. photocured, thermally cured, moisture-cured, etc.) may be used to attach a high-visibility material to the desired area.

The above embodiments are examples of a general approach in which a pre-existing high visibility material (e.g. a film or sheet) is bonded to the desired area. In other embodiments, a visual indicator may be provided by using a liquid material that is deposited (e.g. coated) onto a desired area 205 and then solidified to form the visual indicator. Such approaches may rely on the use of e.g. any suitable coating, paint, lacquer, varnish, or the like, that is provided with one or more of pigments, dyes, reflective particles, or the like, to impart the desired visibility.

A visual indicator 204 need not rely strictly, or even in part, on the actual color of the indicator. Rather, in some embodiments, reflective properties (that may or may not be wavelength-independent) of the indicator may provide, or at least contribute to, the visual indication. This may be particularly useful in instances in which, for example, the anchorage assembly is to be installed in a strut channel that is in the ceiling of a relatively dark or unlighted location. In such cases, a user (or inspector, or other qualified person) might shine a flashlight at the anchorage assembly in order to determine whether the assembly has been properly installed. Thus, a visual indicator that provides a reflective signal may be used (strictly speaking, of course, it will usually be the absence of a reflective signal that confirms that the indicator is obscured by the strut channel, indicating that the assembly is properly installed).

Thus in some embodiments, a visual indicator 204 may be used that exhibits highly reflective, e.g. specularly reflective, properties (such a reflective indicator may also possess a distinctive or bright color, of course). In some examples, such an indicator may take the form of one or more pieces of reflective adhesive tape, e.g. that exhibit specular reflection. Such tapes may e.g. comprise a metallized tape backing or the like. Or, such a visual indicator may be provided by coating (e.g. plating or vapor-coating) one or more regions of area 205 with chromium, aluminum, gold, or any other suitably highly-reflective metal.

The above embodiments are examples of a general approach in which an outward area 205 of the underside of a flange of a plate is modified or treated so that it exhibits a visual signal (e.g. a noticeable color and/or higher reflectivity) in comparison to an existing, unmodified, inward area 206 of the underside of the flange of the plate. However, in some embodiments it is the inward area 206 that may be modified in order that the outward area 205 exhibits a visual signal in comparison to inward area 206. For example, in many convenient embodiments, plates 10 and 110 of anchorage assembly 1 may be made of a metal such as e.g. stainless steel. In such a case, at least some areas of the plates, including e.g. the underside of the outwardly-extending flanges, may have a relatively smooth surface (e.g. may be polished to a mirror finish). Such a surface may inherently be highly reflective. In such instances, an outwardmost area 205 of the underside of the outwardly-extending flange of a plate may be left "as-is", while an inwardmost (neighboring) area 206 of the underside may be e.g. ground, abraded, sandblasted, etched, or otherwise treated to roughen or texturize the surface of this area so that it is not highly reflective. Similar effects may be achieved e.g. by mounting a strip of dark-colored and/or matte-finish adhesive tape in inwardmost area 206. It will thus be understood that the concept of a visual indicator as disclosed herein encompasses cases in which an inwardmost area 206 is modified to reduce its visibility relative to a neighboring outwardmost area 205, in order that the outwardmost area can serve as a visual indicator.

It will be appreciated that many variations on the above arrangements are possible. Thus in some embodiments, a strip of brightly colored (e.g. red) and/or reflective tape may be mounted in outwardmost area 205, with a strip of dark, nonreflective tape (e.g. a matte-finish black tape) being mounted in inwardmost area 206. In some embodiments, a visual indicator (whether in the form of a film, tape, coating, or treatment) may be a retroreflective indicator that exhibits a coefficient of retroreflection of at least 50, 100, 200, or 400 candela per lux per square meter, when measured according to the procedures outlined in paragraph 0113 of U.S. Patent Application Publication No. 20170276844, which Publication is incorporated by reference herein in its entirety for this purpose. In some embodiments, a visual indicator in an outwardmost area 205 may be provided with a protective coating (e.g. a protective transparent film, or a so-called hardcoat or the like) that enhances the abrasion resistance of the indicator or area.

Figure 13:
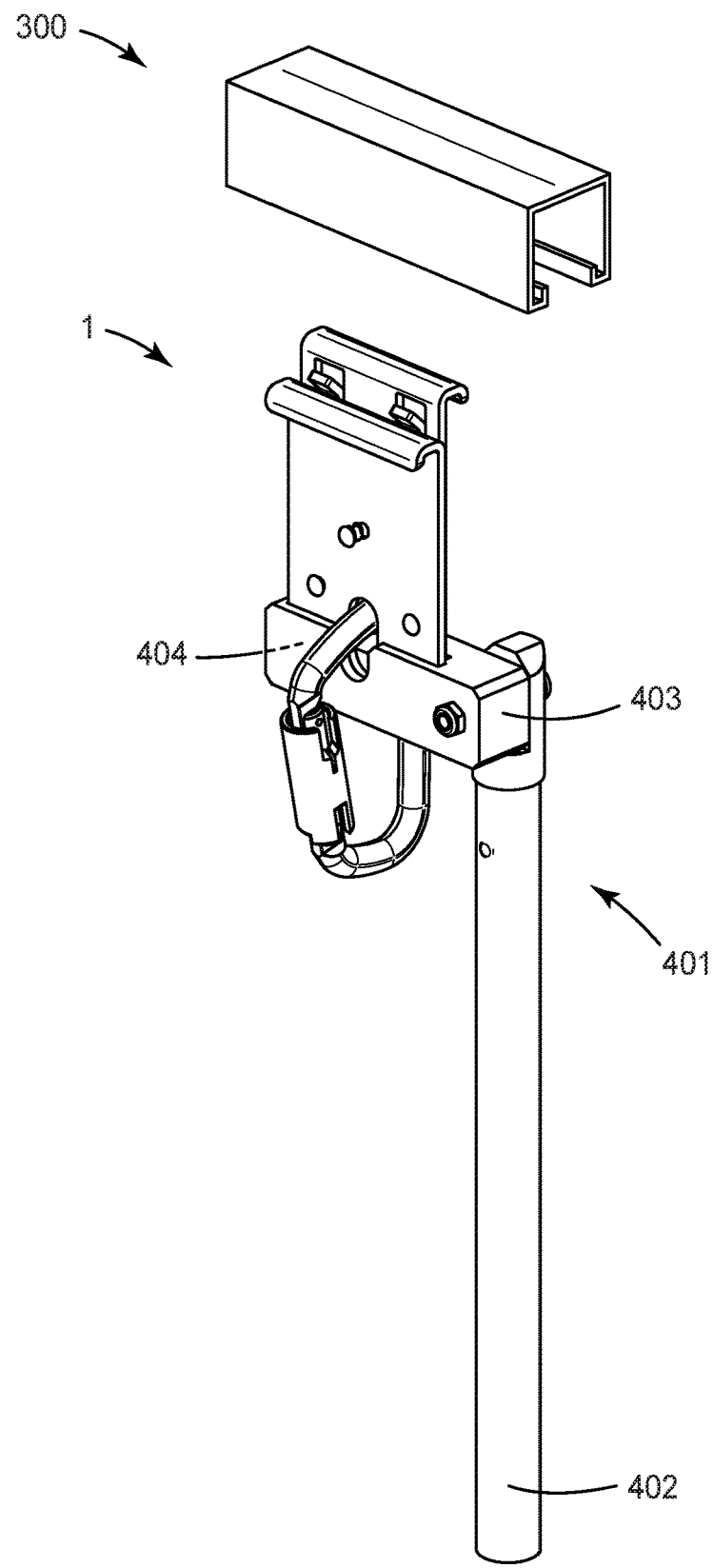
FIG. 13 is a perspective view of an anchorage-installation assembly bearing an anchorage assembly in a first, ready position.
Figure 14:
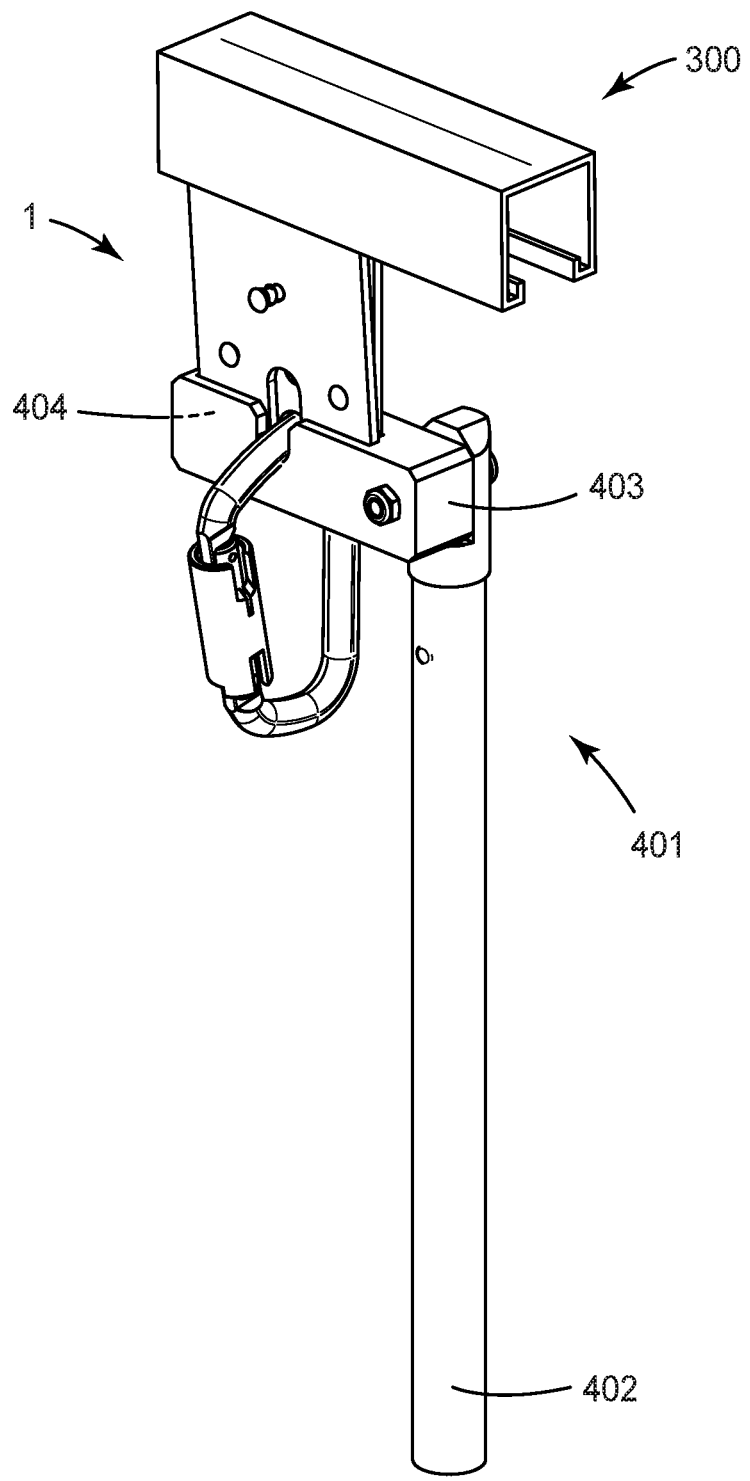
FIG. 14 is a perspective view of an anchorage-installation assembly bearing an anchorage assembly in a second, installed position.

In some embodiments, during installation of anchorage assembly 1 into a strut channel, anchorage assembly 1 may be held atop an installation pole 402 to form an installation assembly 401 as shown in exemplary embodiment in FIGS. 13 and 14. This may allow anchorage assembly 1 to be installed in elevated and/or hard-to-reach places without necessitating that a user climb to within arms-length of the strut channel. To facilitate such use, installation pole 402 may comprise an installation head 403 that comprises an upward-facing slot 404 into which the lower end 5 of anchorage assembly 1 (i.e., the lower ends 12 and 112 of first and second plates 10 and 110) may be fitted. The pole may then be used to move anchorage assembly 1 upward into a desired strut channel Once upper end 11 of first plate 10 contacts the ceiling of the strut channel, continued upward movement may be applied to urge second plate 110 to slidably move into the second, installed configuration as shown in FIG. 14. Once this is performed, the anchorage assembly may be lowered slightly so that it engages with the holders of the strut channel, after which the pole and installation head can be further lowered so that the lower end of the anchorage assembly exits slot 404.

In some embodiments, an anchorage assembly 1 as installed into a strut channel may be configured so that is able to slide along the elongate length of the strut channel. In other embodiments, the anchorage assembly may be configured so that it remains in the place it was installed, without moving along the strut channel.

As shown in FIGS. 13 and 14, in some embodiments an anchorage assembly 1 may have a fastener 7 (in this case, a carabiner) connected thereto before the anchorage assembly is installed into the strut channel. In fact, in some embodiments the fastener may already have an item (e.g. a self-retracting lifeline) attached thereto before the anchorage assembly is installed. To allow for such instances, if desired installation head 403 may comprise one or more actuators (e.g. spring-loaded pistons, clamps or the like) that hold first and second plates 10 and 110 so that the weight of an item that is attached to the plates does not cause the plates to vertically slidably move relative to each other in a way that would cause them to enter their second, installed position before the desired time. Such actuators can be configured to resist such gravitational forces but to nevertheless be overcome by a large enough force (e.g. by continued upward urging of the installation head and the anchorage assembly after the upper end of first plate 10 has contacted the ceiling of the strut channel) so that they allow the plates to slidably move into their second, installed position at the desired time.

In general, anchorage assembly 1 may be configured to be installed into a strut channel 300 and to facilitate the connection of any item to the anchorage assembly so that the item is supported by the installed anchorage assembly. The term "item" is used broadly and encompasses any single item, collection of items, system, apparatus, and so on, with specific examples being noted below. In particular embodiments, anchorage assembly 1 may be used to allow a safety line to be attached to anchorage assembly 1. The term safety line is used broadly and encompasses any single line or cable or combinations of multiple lines or cables, connected to any suitable safety equipment. In specific embodiments a safety line may be a so-called self-retracting lifeline (SRL). As noted earlier herein, an SRL may comprise a housing that is connected to anchorage assembly 1 e.g. by a carabiner, by a carabiner plus a tether, and so on. An SRL includes a reel within the housing, which reel allows a line (that is typically attached to a harness of a worker) to travel with the worker as the worker moves about an elevated workplace and to be automatically reeled in when the worker moves closer to the housing. An SRL also includes a brake (e.g. a centrifugal brake) that is triggered e.g. in the event of a worker fall. Fall-protection apparatus such as self-retracting lifelines are described in various aspects in U.S. Pat. Nos. 7,843,349, 8,256,574, 8,430,206, 8,430,207, and 9,488,235. In general, an anchorage assembly 1 as disclosed herein may be used as part of any safety line system, including but not limited to a horizontal lifeline or retractable horizontal lifeline, a positioning lanyard or system, a shock-absorbing lanyard, a rope adjuster or rope grab, a load arrester, a vertical safety system (such as e.g. a flexible cable, rigid rail, climb assist, or fixed ladder safety system), a confined-space rescue system or hoist system, and so on. Thus in summary, an anchorage assembly as disclosed herein may be used as part of any desired personal height-safety fall-protection system, e.g. a self-retracting lifeline, as long as appropriate standards and procedures are followed.

As discussed below, some anchorage assemblies that are encompassed by the present disclosure may be used for purposes other than fall protection; in such cases, an anchorage assembly may only need to satisfy whatever requirements are appropriate for that particular use (and, for example, the components of the anchorage assembly may be made of whatever material is suitable for that use). However, it will be understood that any anchorage assembly will be only used in accordance with the specific instructions provided for the designated use of that particular anchorage assembly. And, it will be understood that any anchorage assembly that is used with a personal height-safety fall-protection system will be used in accordance with the specific instructions provided and will meet all applicable governmental (e.g. local, state, federal, and/or national) standards. In some embodiments, a safety line (such as e.g. an SRL) with which an anchorage assembly is used will meet the requirements of ANSI Z359.14-2012, as specified in 2012. In some embodiments, an anchorage assembly will meet the requirements of ANSI Z369.18-2017, as specified in 2017.

In at least some embodiments in which anchorage assembly 1 is to support a safety line such as e.g. an SRL, anchorage assembly 1 may be installed into a strut channel 300 that is embedded into a surface (e.g. a downward-facing surface) of a concrete member, slab or platform. Any such strut channel that is used for fall-protection purposes will meet all applicable standards and performance requirements, e.g. it may be capable of sustaining a static load of 5000 pounds. In many embodiments, such a strut channel may be made of e.g. steel. In such embodiments, plates 10 and 110 of anchorage assembly 1 may be made of steel, e.g. 12 gauge steel sheet into which are formed (e.g. by bending, rolling, stamping, cutting, etc.) various features such as flanges, lips, spreader ramps, windows, through-holes, and so on.

Although the discussion of anchorage assemblies herein has primarily concerned their use with safety lines, it is emphasized that an anchorage assembly 1 as disclosed herein may be used for any purpose in which it is desired to attach an item to a strut channel Such an item may be e.g. a pipe, an electrical conduit or raceway, an HVAC duct and so on. Such items are not limited to e.g. elongated items. Thus such an item might be e.g. a plumbing component, an electrical component, a lighting component, or, in general, any bracket, clamp, fixture or the like that may be used to support a piping, plumbing, electrical, or lighting component. It will be appreciated that such uses may not necessarily require the same performance properties as may be required e.g. for a safety line such as an SRL. Thus, an anchorage assembly for any such use may be made of any suitable material, e.g. plastic, reinforced plastic (e.g. fiber-reinforced plastic), composite materials, lightweight metals such as aluminum and so on. Similarly, for such purposes such an anchorage assembly may be installed into a strut channel that is made of plastic, reinforced plastic, aluminum, and so on. As noted, installation of an anchorage assembly into a strut channel may be temporary (e.g. during a particular work period) or permanent.

An anchorage assembly as disclosed herein may be of any suitable shape and size. For example, an anchorage assembly that is configured to be installed into a 1⅝ inch wide strut channel may comprise a vertical height of e.g. from 9 to 13 cm. An anchorage assembly may exhibit any suitable transverse extent that provides sufficient stability in view of the use to which the assembly will be put. For example, an anchorage assembly may comprise a transverse extent of e.g. from 4 to 10 cm.

Although the discussion of uses of an anchorage assembly has concerned installation of the anchorage assembly into a strut channel that is oriented base-upward, with a downward-facing open end (e.g. an overhead-mounted strut channel), it is noted that such an anchorage assembly may be used in strut channels of other orientations (e.g., wall-mounted) as well. In such a case the disclosures and descriptions provided herein still apply, with the condition that the anchorage assembly and/or the strut channel shall be rotated to a vertical configuration in order to perform the evaluations and characterizations presented herein.

LIST OF EXEMPLARY EMBODIMENTS

Embodiment 1 is an anchorage assembly comprising first and second plates that are connected to each other so that the plates are slidably movable relative to each other, wherein a first upper end of the first plate comprises a first upper head comprising a first flange that extends outwardly in a first direction and wherein a second upper end of the second plate comprises a second upper head comprising a second flange that extends outwardly in a second, opposite direction, and wherein the first plate comprises at least one spreader ramp positioned in an upper portion of the first plate.

Embodiment 2 is the anchorage assembly of embodiment 1 wherein the first and second plates are vertically slidably movable relative to each other between a first, ready position, in which the second upper head of the second plate is positioned lower than the first upper head of the first plate; and, a second, installed position, in which the second upper head of the second plate is positioned at least generally at the same vertical height as the first upper head of the first plate and in which the upper end of the second plate is displaced outwardly away from the upper end of the first plate.

Embodiment 3 is the anchorage assembly of embodiment 2 wherein when the first and second plates are in their first, ready position the second plate and the first plate are parallel to each other to within 1 degree; and, wherein when the first and second plates are in their second, installed position, the second upper end of the second plate is angled outwardly from the first upper end of the first plate so that the first and second plates exhibit a spreading angle of from 2 degrees to 5 degrees.

Embodiment 4 is the anchorage assembly of any of embodiments 2-3 wherein when the first and second plates are in their second, installed position, the upper end of the second plate is displaced outwardly away from the upper end of the first plate so that the plates exhibit a plate spacing ratio of from 10 percent to 30 percent.

Embodiment 5 is the anchorage assembly of any of embodiments 2-4 wherein when the first and second plates are in their first, ready position, the first upper head of the first plate provides an uppermost end of the anchorage assembly and a lower end of the second plate provides an lowermost end of the anchorage assembly.

Embodiment 6 is the anchorage assembly of any of embodiments 2-5 wherein the second plate comprises at least one-ramp-receiving window and wherein when the first and second plates are in their first, ready position, at least a distal end portion of the at least one spreader ramp of the first plate protrudes through the at least one ramp-receiving window of the second plate.

Embodiment 7 is the anchorage assembly of any of embodiments 1-6 wherein the at least one spreader ramp of the first plate exhibits a ramp angle of from 30 degrees to 60 degrees.

Embodiment 8 is the anchorage assembly of any of embodiments 1-7 wherein the at least one spreader ramp of the first plate is integrally joined to a main body of the first plate by an integral junction that exhibits a radius of curvature of at least 2 mm.

Embodiment 9 is the anchorage assembly of any of embodiments 1-8 wherein the outwardly-extending flange of the first upper head of the first plate is integrally joined to a main body of the first plate by an integral junction that exhibits a radius of curvature of at least 5 mm.

Embodiment 10 is the anchorage assembly of any of embodiments 1-9 wherein the at least one spreader ramp, the outwardly-extending flange, and a main body of the first plate, from which main body the at least one spreader ramp protrudes and from an upper end of which main body the outwardly-extending flange extends, are all portions of a single, integral body.

Embodiment 11 is the anchorage assembly of any of embodiments 1-10 wherein the at least one spreader ramp of the first plate comprises first and second spreader ramps that are spaced apart from each other along a transverse axis of the first plate and are equidistant from a transverse centerline of the first plate.

Embodiment 12 is the anchorage assembly of any of embodiments 1-11 wherein the first and second plates are non-separably connected to each other by at least one retainer that passes through a first retaining aperture in a main body of the first plate and through a second retaining aperture in a main body of the second plate, the first and second retaining apertures being at least generally aligned with each other and with at least one of the apertures being a vertically elongated slot along which the retainer is free to slidably move.

Embodiment 13 is the anchorage assembly of embodiment 12 wherein the at least one retainer is configured to allow the main body of the second plate to be displaced outwardly away from the main body of the first plate while still retaining the first and second plates in a configuration in which they are non-separably connected to each other.

Embodiment 14 is the anchorage assembly of any of embodiments 12-13 wherein the first and second plates are non-separably connected to each other by two retainers, the two retainers being spaced apart from each other along a transverse axis of the first plate.

Embodiment 15 is the anchorage assembly of any of embodiments 1-14 wherein the anchorage assembly is configured to be installed into a strut channel and to facilitate the attachment of an item to the anchorage assembly so that the item is supported by the installed anchorage assembly.

Embodiment 16 is the anchorage assembly of any of embodiments 1-15 wherein the anchorage assembly is configured to allow a safety line to be attached to the anchorage assembly by way of a first attachment orifice in a lower portion of a main body of the first plate and a second attachment orifice in a lower portion of a main body of the second plate, the attachment orifices being at least generally aligned with each other, and being sized and shaped, to allow a fastener of a safety line to pass through the attachment orifices.

Embodiment 17 is the anchorage assembly of embodiment 16 wherein at least one of the first and second attachment orifices is a vertically elongated slot along which the fastener is free to slidably move.

Embodiment 18 is the anchorage assembly of any of embodiments 1-17 wherein the anchorage assembly comprises a lock that is engagable to lock the first and second plates in a second, installed position in which the second upper head of the second plate is positioned at least generally at the same vertical height as the first upper head of the first plate and in which the upper end of the second plate is displaced outwardly away from the upper end of the first plate by the spreader ramp, with the lock being configured so that when the lock is engaged it prevents the first and second plates from vertically slidably moving relative to each other out of the second, installed position and into a first, ready position in which the second upper head of the second plate is positioned lower than the first upper head of the first plate, until the lock is disengaged.

Embodiment 19 is the anchorage assembly of embodiment 18 wherein the lock is configured so that it automatically engages upon slidable vertical movement of the first and second plates from the first, ready position to the second, installed position, and is configured so that the lock must be manually disengaged in order to allow the first and second plates to be slidably vertically moved from the second, installed position to the first, ready position.

Embodiment 20 is the anchorage assembly of any of embodiments 18-19 wherein the lock comprises an elongate member that comprises a first longitudinal portion that passes through a keyhole aperture in one of the plate, the first longitudinal portion comprising an expanded-diameter shoulder that is sized to fit within a circle portion of the keyhole aperture but that is sized too large to fit within a slot portion of the keyhole aperture, and wherein the elongate member comprises a second portion that passes through an lock aperture in the other one of the plates.

Embodiment 21 is the anchorage assembly of embodiment 20 wherein the lock comprises a biasing element that urges the first longitudinal portion of the elongate member inward toward the keyhole slot and that urges the second longitudinal portion of the member outward away from the lock aperture.

Embodiment 22 is the anchorage assembly of any of embodiments 1-21 wherein the first outwardly-extending flange of the first upper head of the first plate is configured to engage with a first lip of a strut channel and wherein the second outwardly-extending flange of the second upper head of the second plate is configured to engage with a second, opposing lip of the strut channel.

Embodiment 23 is the anchorage assembly of any of embodiments 1-22 wherein the first outwardly-extending flange of the first upper head of the first plate comprises a first lip extending downwardly therefrom and wherein the second outwardly-extending flange of the second upper head of the second plate comprises a second lip extending downwardly therefrom.

Embodiment 24 is the anchorage assembly of any of embodiments 1-23 wherein a first visual indicator is provided on an outward area of an underside of the first outwardly-extending flange of the first upper head of the first plate and wherein a second visual indicator is provided on an outward area of an underside of the second outwardly-extending flange of the second upper head of the second plate.

Embodiment 25 is an anchorage-installation assembly comprising the anchorage assembly of any of embodiments 1-24 wherein a lower end of the anchorage assembly is fitted into a upward-facing slot of an installation head located at an upper end of an installation pole, the upward-facing slot being configured to receive the lower end of the anchorage assembly and to support the anchorage assembly during remote installation of the anchorage assembly into a strut channel by a user grasping a lower end of the installation pole.

Embodiment 26 is a method of installing an anchorage assembly into a strut channel, the method comprising: with first and second plates of the anchorage assembly in a first, ready position, inserting an upper end of the anchorage assembly into an interior of the strut channel; slidably moving the first and second plates relative to each other from the first, ready position into a second, installed position in which an upper end of the second plate is displaced outwardly away from an upper end of the first plate; and, lowering the anchorage assembly so that a first upper head of the first plate, and a second upper head of the second plate, each engage a holder of the strut channel.

Embodiment 27 is the method of embodiment 26 using the anchorage assembly of any embodiments 1-25.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein but to which no priority is claimed, this specification as written will control.

What is claimed is:

1. An anchorage assembly comprising:
first and second plates that are connected to each other so that the plates are slidably movable relative to each other, wherein a first upper end of the first plate comprises a first upper head comprising a first flange that extends outwardly in a first direction and wherein a second upper end of the second plate comprises a second upper head comprising a second flange that extends outwardly in a second, opposite direction,
and wherein the first plate comprises at least one spreader ramp positioned in an upper portion of the first plate.

2. The anchorage assembly of claim 1 wherein the first and second plates are vertically slidably movable relative to each other between a first, ready position, in which the second upper head of the second plate is positioned lower than the first upper head of the first plate; and, a second, installed position, in which the second upper head of the second plate is positioned at least generally at the same vertical height as the first upper head of the first plate and in which the upper end of the second plate is displaced outwardly away from the upper end of the first plate.

3. The anchorage assembly of claim 2 wherein when the first and second plates are in their first, ready position the second plate and the first plate are parallel to each other to within 1 degree; and, wherein when the first and second plates are in their second, installed position, the second upper end of the second plate is angled outwardly from the first upper end of the first plate so that the first and second plates exhibit a spreading angle of from 2 degrees to 5 degrees.

4. The anchorage assembly of claim 2 wherein when the first and second plates are in their second, installed position, the upper end of the second plate is displaced outwardly away from the upper end of the first plate so that the plates exhibit a plate spacing ratio of from 10 percent to 30 percent.

5. The anchorage assembly of claim 2 wherein when the first and second plates are in their first, ready position, the first upper head of the first plate provides an uppermost end of the anchorage assembly and a lower end of the second plate provides a lowermost end of the anchorage assembly.

6. The anchorage assembly of claim 2 wherein the second plate comprises at least one-ramp-receiving window and wherein when the first and second plates are in their first, ready position, at least a distal end portion of the at least one spreader ramp of the first plate protrudes through the at least one ramp-receiving window of the second plate.

7. The anchorage assembly of claim 1 wherein the at least one spreader ramp of the first plate exhibits a ramp angle of from 30 degrees to 60 degrees.

8. The anchorage assembly of claim 1 wherein the at least one spreader ramp of the first plate is integrally joined to a main body of the first plate by an integral junction that exhibits a radius of curvature of at least 2 mm.

9. The anchorage assembly of claim 1 wherein the at least one spreader ramp, the outwardly-extending flange, and a main body of the first plate, from which main body the at least one spreader ramp protrudes and from an upper end of which main body the outwardly-extending flange extends, are all portions of a single, integral body.

10. The anchorage assembly of claim 1 wherein the at least one spreader ramp of the first plate comprises first and second spreader ramps that are spaced apart from each other along a transverse axis of the first plate and are equidistant from a transverse centerline of the first plate.

11. The anchorage assembly of claim 1 wherein the first and second plates are non-separably connected to each other by at least one retainer that passes through a first retaining aperture in a main body of the first plate and through a second retaining aperture in a main body of the second plate, the first and second retaining apertures being at least generally aligned with each other and with at least one of the apertures being a vertically elongated slot along which the retainer is free to slidably move.

12. The anchorage assembly of claim 11 wherein the at least one retainer is configured to allow the main body of the second plate to be displaced outwardly away from the main body of the first plate while still retaining the first and second plates in a configuration in which they are non-separably connected to each other.

13. The anchorage assembly of claim 1 wherein the anchorage assembly is configured to allow a safety line to be attached to the anchorage assembly by way of a first attachment orifice in a lower portion of a main body of the first plate and a second attachment orifice in a lower portion of a main body of the second plate, the attachment orifices being at least generally aligned with each other, and being sized and shaped, to allow a fastener of a safety line to pass through the attachment orifices.

14. The anchorage assembly of claim 13 wherein at least one of the first and second attachment orifices is a vertically elongated slot along which the fastener is free to slidably move.

15. The anchorage assembly of claim 1 wherein the anchorage assembly comprises a lock that is engagable to lock the first and second plates in a second, installed position in which the second upper head of the second plate is positioned at least generally at the same vertical height as the first upper head of the first plate and in which the upper end of the second plate is displaced outwardly away from the upper end of the first plate by the spreader ramp, with the lock being configured so that when the lock is engaged it prevents the first and second plates from vertically slidably moving relative to each other out of the second, installed position and into a first, ready position in which the second upper head of the second plate is positioned lower than the first upper head of the first plate, until the lock is disengaged.

16. The anchorage assembly of claim 15 wherein the lock is configured so that it automatically engages upon slidable vertical movement of the first and second plates from the first, ready position to the second, installed position, and is configured so that the lock must be manually disengaged in order to allow the first and second plates to be slidably vertically moved from the second, installed position to the first, ready position.

17. The anchorage assembly of claim 1 wherein the first outwardly-extending flange of the first upper head of the first plate comprises a first lip extending downwardly therefrom and wherein the second outwardly-extending flange of the second upper head of the second plate comprises a second lip extending downwardly therefrom.

18. The anchorage assembly of claim 1 wherein a first visual indicator is provided on an outward area of an underside of the first outwardly-extending flange of the first upper head of the first plate and wherein a second visual indicator is provided on an outward area of an underside of the second outwardly-extending flange of the second upper head of the second plate.

19. An anchorage-installation assembly comprising the anchorage assembly of claim 1 wherein a lower end of the anchorage assembly is fitted into a upward-facing slot of an installation head located at an upper end of an installation pole, the upward-facing slot being configured to receive the lower end of the anchorage assembly and to support the anchorage assembly during remote installation of the anchorage assembly into a strut channel by a user grasping a lower end of the installation pole.

20. The anchorage assembly of claim 1 wherein the anchorage assembly is configured to be installed into a strut channel and to facilitate the attachment of an item to the anchorage assembly so that the item is supported by the installed anchorage assembly.

\* \* \* \* \*

UNITED STATES PATENT AND TRADEMARK OFFICE
CERTIFICATE OF CORRECTION

PATENT NO. : 10,967,209 B2
APPLICATION NO. : 16/975992
DATED : April 6, 2021
INVENTOR(S) : Michael N. Milbright Page 1 of 1

It is certified that error appears in the above-identified patent and that said Letters Patent is hereby corrected as shown below:

In the Specification

Column 3
Line 36, delete "channel" and insert -- channel. --, therefor.
Line 61, delete "channel" and insert -- channel. --, therefor.

Column 4
Line 5, delete "W1" and insert -- $W_i$ --, therefor.

Column 18
Line 61, delete "channel" and insert -- channel. --, therefor.

Column 20
Line 38, delete "channel" and insert -- channel. --, therefor.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*